United States Patent [19]
Gaza

[11] Patent Number: 6,002,237
[45] Date of Patent: Dec. 14, 1999

[54] MICROCONTROLLED BATTERY CHARGER

[75] Inventor: Brian Scott Gaza, Naperville, Ill.

[73] Assignee: International Components Corp., Chicago, Ill.

[21] Appl. No.: 09/089,707

[22] Filed: Jun. 3, 1998

Related U.S. Application Data

[63] Continuation-in-part of application No. 08/818,313, Mar. 14, 1997, Pat. No. 5,764,030.

[51] Int. Cl.$^6$ .......................... H01M 10/44; H01M 10/46
[52] U.S. Cl. .......................... 320/116; 320/120; 320/145
[58] Field of Search .................................. 320/116, 120, 320/124, 136, 145

[56] References Cited

U.S. PATENT DOCUMENTS

| | | |
|---|---|---|
| 4,006,396 | 2/1977 | Bogut . |
| 4,472,672 | 9/1984 | Pacholok . |
| 4,670,703 | 6/1987 | Williams . |
| 4,673,861 | 6/1987 | Dubovsky et al. . |
| 4,684,870 | 8/1987 | George et al. . |
| 4,686,444 | 8/1987 | Park . |
| 4,727,306 | 2/1988 | Misak et al. . |
| 4,742,290 | 5/1988 | Sutphin et al. . |
| 4,755,733 | 7/1988 | Laliberté . |
| 4,766,361 | 8/1988 | Pusateri . |
| 4,792,743 | 12/1988 | Tsujino et al. . |
| 4,816,735 | 3/1989 | Cook et al. . |
| 4,849,682 | 7/1989 | Bauer et al. . |
| 5,028,859 | 7/1991 | Johnson et al. . |
| 5,166,596 | 11/1992 | Goedken . |
| 5,258,245 | 11/1993 | Takata et al. . |
| 5,315,228 | 5/1994 | Hess et al. . |
| 5,442,274 | 8/1995 | Tamai . |
| 5,481,174 | 1/1996 | Martin et al. . |
| 5,481,730 | 1/1996 | Brown et al. . |
| 5,518,832 | 5/1996 | Fernandez et al. . |
| 5,539,299 | 7/1996 | Fernandez et al. . |
| 5,568,039 | 10/1996 | Fernandez . |
| 5,576,609 | 11/1996 | Brown et al. . |
| 5,590,419 | 12/1996 | Shimo . |
| 5,623,196 | 4/1997 | Fernandez et al. . |
| 5,628,054 | 5/1997 | Osaka . |
| 5,631,537 | 5/1997 | Armstrong . |
| 5,637,413 | 6/1997 | Fernandez et al. . |
| 5,666,006 | 9/1997 | Townsley et al. . |
| 5,670,862 | 9/1997 | Lewyn . |
| 5,686,816 | 11/1997 | Hayashi et al. . |
| 5,691,620 | 11/1997 | Nagai et al. . |
| 5,695,886 | 12/1997 | Dewan et al. . |
| 5,764,030 | 6/1998 | Gaza ................................... 320/120 X |

FOREIGN PATENT DOCUMENTS 2 399 150  2/1979  France .

OTHER PUBLICATIONS

Jasinski, "Chargers for Batteries with Auxiliary Cells", Motorola Technical Developments, vol. 8, Oct. 1988, pp. 107–108.

Radio Shack 1988 Catalog, No. 419, p. 150.

Gates Energy Products, Inc., product literature entitled "Sealed Rechargeable Batteries—Application Manual", 1989, title page, pp. iii, 150–162.

Duracell Inc., Intel Corporation, product literature entitled "Smart Battery Specifications", 1993,94, 36 pages.

Sanyo, product literature entitled Sanyo Smart Chip–Model SI–101 Hybrid IC Fast Charge Control Unit, undated, 5 pages.

*Primary Examiner*—Edward H. Tso
*Attorney, Agent, or Firm*—Fitch, Even, Tabin & Flannery

[57] ABSTRACT

A battery charger for fast charging batteries, such as batteries requiring constant current charging, such as lithium ion batteries. The battery charger provides charging voltages across a battery pack having at least one rechargeable cell connected to battery terminals. The battery charger includes a digital to analog converter circuit for controlling a current source for supplying a charging current to the battery pack. The digital to analog converter may provide a constant current or a constant voltage output as a function of the battery characteristics. An analog to digital converter measures a first voltage across the battery pack while the battery pack is being charged and a second voltage across the battery pack while the charging current is interrupted, and a digital processor determines the potential difference between the first voltage and the second voltage to determine a voltage drop across the terminals of the battery pack. A memory stores an optimum voltage level for charging the rechargeable cell, and a digital interface from the processor is used to adjust the setting of the digital to analog converter to provide the optimum voltage level at the rechargeable cell identified from the memory. The battery charger may include dual pockets for charging two battery packs.

25 Claims, 33 Drawing Sheets

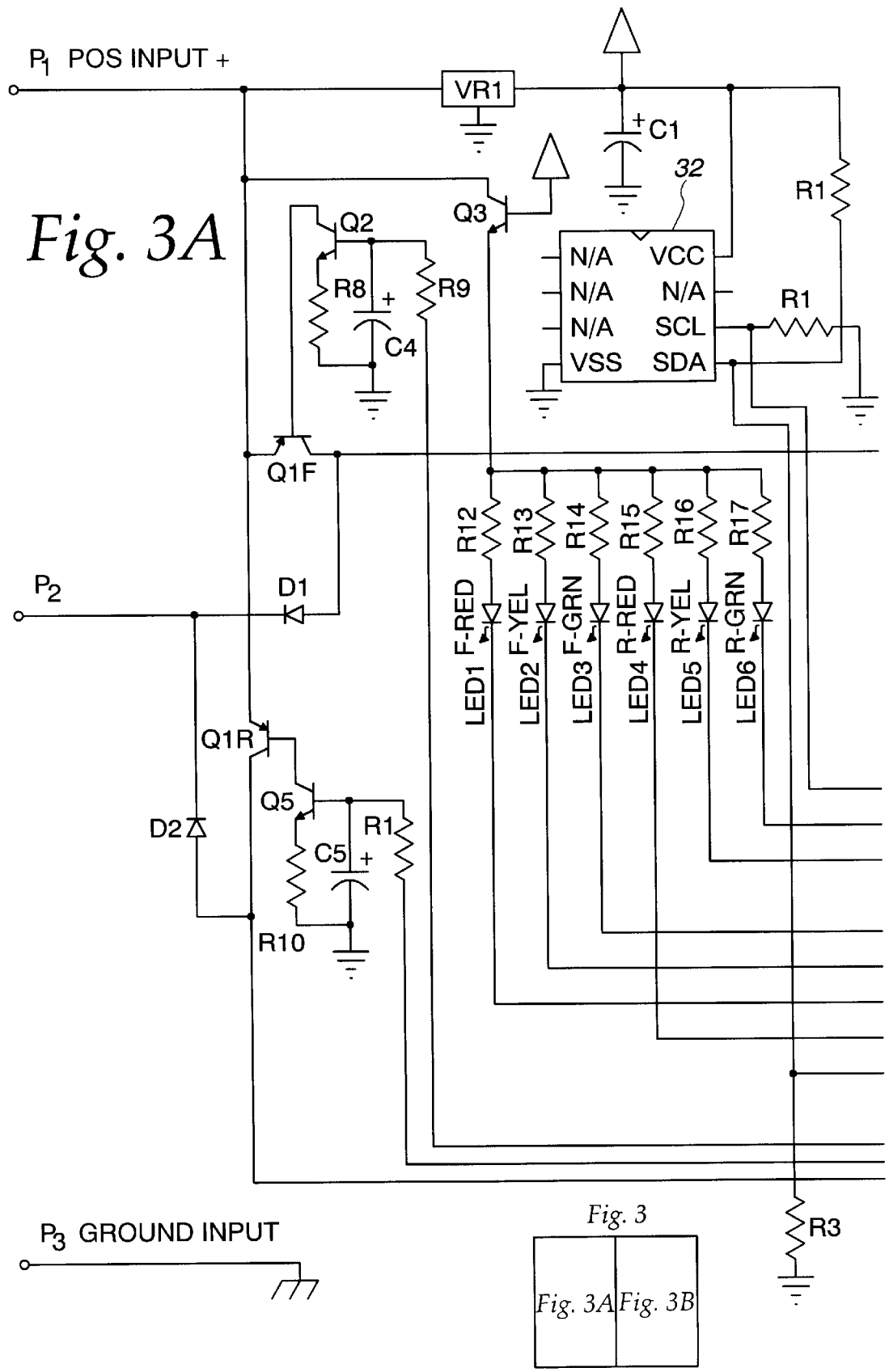

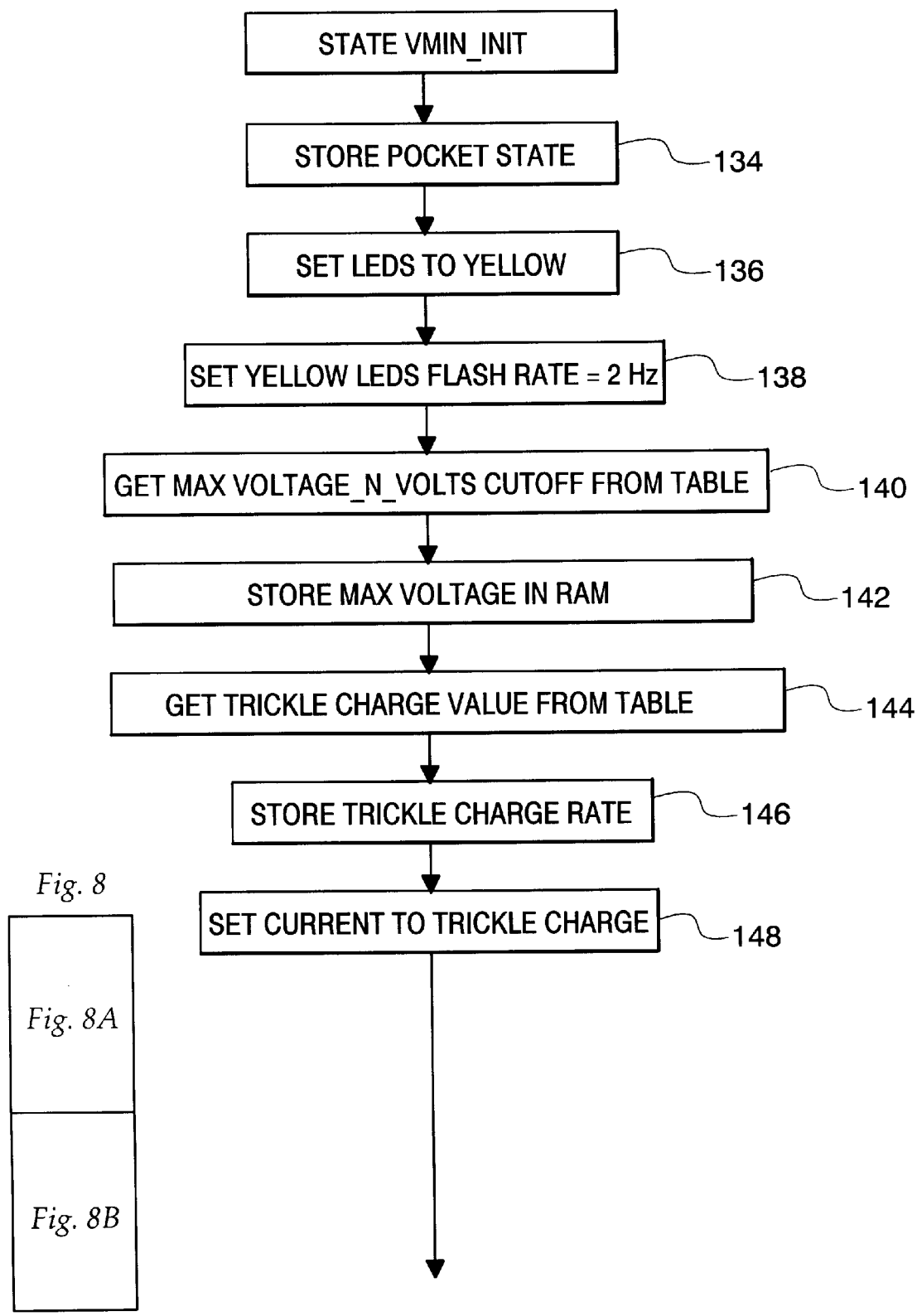

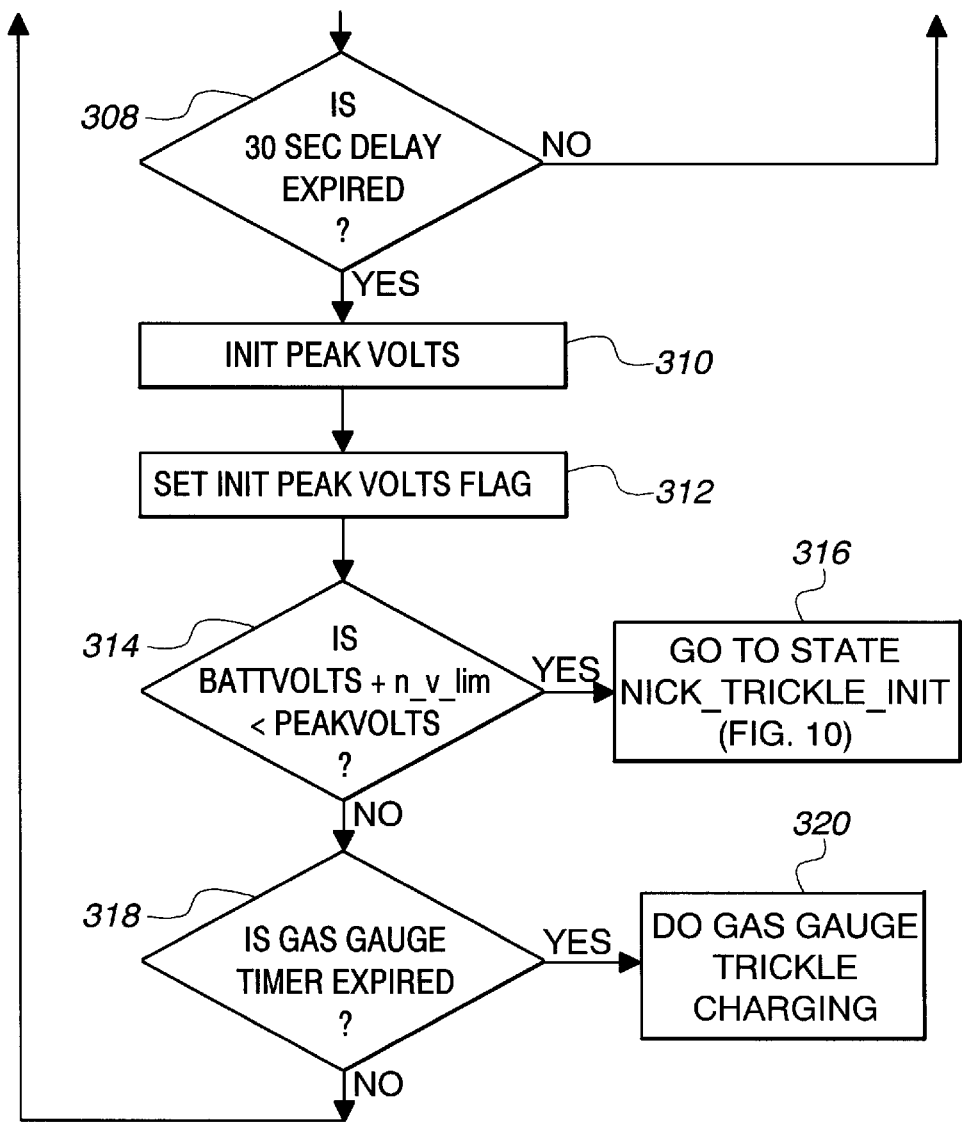
Fig. 11
Fig. 11B

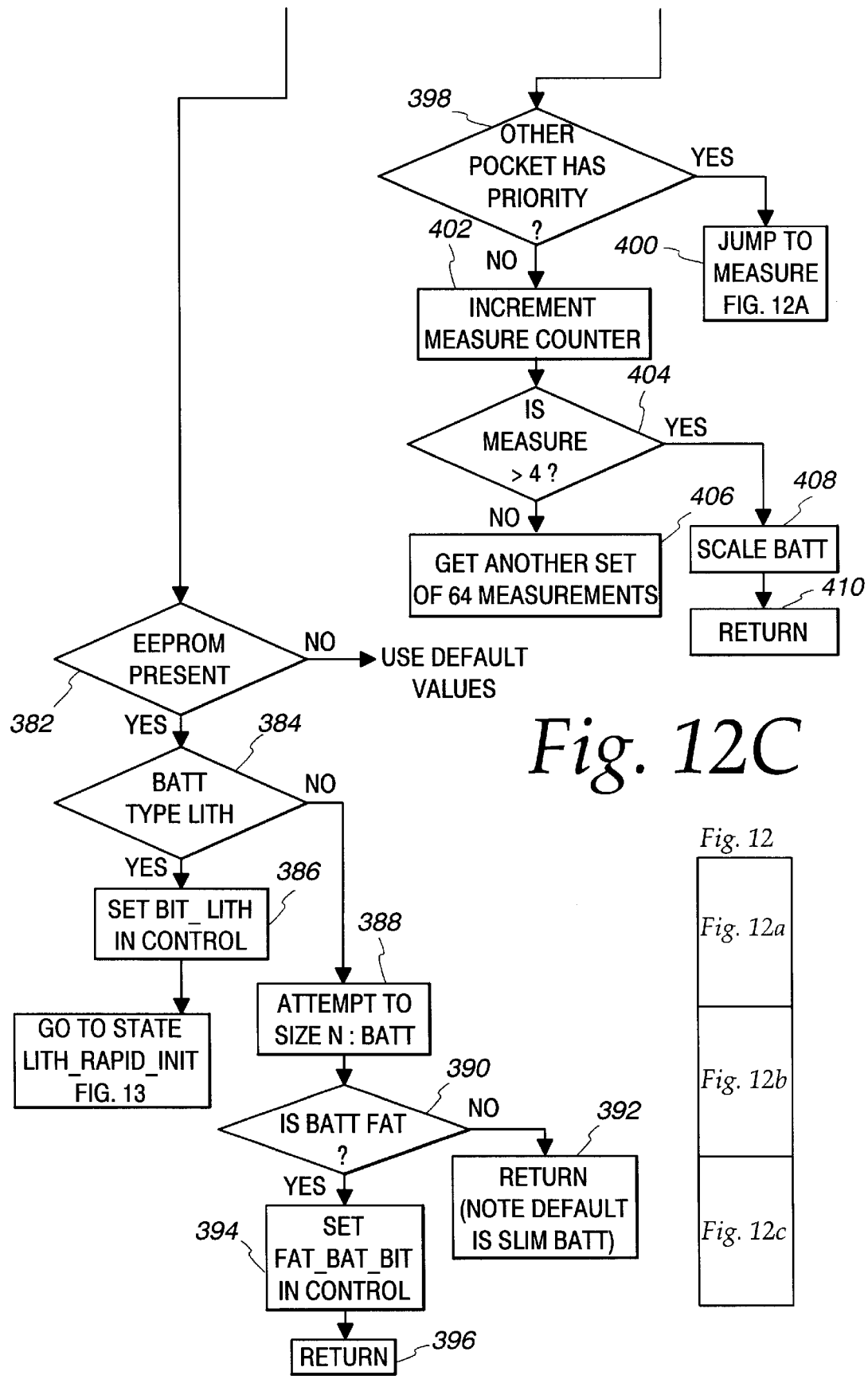
Fig. 12C
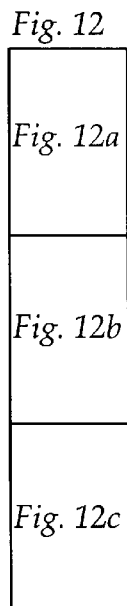

MICROCONTROLLED BATTERY CHARGER

CROSS REFERENCE TO RELATED APPLICATIONS

This is a continuation-in-part of application Ser. No. 08/818,313, filed Mar. 14, 1997, U.S. Pat. No. 5,764,030 which is incorporated herein by reference.

BACKGROUND OF THE INVENTION

1. Field of the Invention

The present invention relates to a battery charger and, more particularly, to a battery charger which automatically compensates for the voltage drop across the battery terminals and any battery protection circuitry to optimize the voltage applied to the battery, making it suitable for charging various types of battery packs including Lithium Ion (LiIon) batteries which require both constant current and constant voltage charging.

Constant voltage battery charging as may be required by nickel-cadmium (NiCd), nickel metal hydride (NiMH), alkaline, as well as lithium ion batteries and the like, is provided in a battery charger with a regulated voltage source for constant voltage charging in which a first voltage measurement across the battery is taken while the battery is being charged, and a second voltage measurement across the battery is taken while the charging current is interrupted. A determination of the potential difference between the first voltage and the second voltage identifies a voltage drop across the terminals and/or protection circuitry of the battery pack, which is used for adjusting the setting of the voltage source to provide the optimum voltage level at the rechargeable cells of the battery pack. Automatic compensation of the voltage source thus provides battery cells under charge with the optimum constant voltage level for recharging, which is particularly well suited for charging lithium ion batteries.

2. Description of the Prior Art

Various portable devices and appliances, such as cellular phones, require rechargeable batteries. Various types of rechargeable batteries are known to be used in such applications. For example, nickel-cadmium (NiCd), nickel metal hydride (NiMH), as well as lithium ion batteries are known to be used. Because of the different charging characteristics of such batteries, different battery chargers are required. For example, both nickel-cadmium (NiCd), as well as nickel metal hydride (NiMH), require constant current charging. On the other hand, lithium ion batteries require constant current charging up to a certain voltage value and constant voltage charging thereafter. Because of the different charging requirements, different charging circuits are often required.

Standard battery packs normally consist of one or more battery cells disposed in a modular housing with external contacts for easy and convenient coupling with the portable device in which it is used. Smart battery packs, in addition to the battery cells, normally include a memory storage device which contains information regarding the characteristics of the battery as well as the battery type.

Some smart battery packs are known to include a microcontroller which allows communication by way of a bi-directional communication line with the battery charger regarding various battery characteristics. Examples of such smart battery packs are disclosed in: "Smart Battery Specifications", ©1993 Duracell Inc., Intel Corporation, hereby incorporated by reference. Because of the differences between the standard battery packs and the smart battery packs, different chargers are used for the smart battery packs and the standard battery packs.

Battery chargers for charging batteries which require constant current charging and batteries which require constant current and constant voltage charging, such as lithium batteries, are known in the art. Battery chargers are also known that are adapted to automatically sense the type of battery connected to the battery charger and provide the appropriate charging characteristic. As mentioned above, such battery chargers are used for various portable devices, such as cellular phones. Cellular phone battery chargers are commonly available as single pocket and dual pocket devices. Dual pocket devices are known to be used for charging a spare battery, as well as the battery connected to the cellular phone. Unfortunately, with known dual pocket battery chargers, each pocket is known to be treated independently. In particular, in situations in which batteries to be charged are disposed in both pockets, the battery in the active pocket is normally fully charged before any servicing of the battery in the other pocket is done. Lithium ion batteries are known to take 3–4 hours to charge. Should a second battery be placed in the inactive pocket while a lithium battery is being charged in an active pocket, the second battery could remain in the inactive pocket for 3–4 hours before charging is even commenced. If the second battery also happens to be a lithium battery, it could take from 6–8 hours for the second battery to be charged from the time the second battery is inserted in the inactive pocket. Unfortunately, the end user will normally not be aware of such a limitation in the charging system.

In known lithium ion battery chargers, as discussed above, a constant current and a constant voltage are used for charging. Known battery chargers maintain a predetermined charging voltage at the charging terminals of the charger and adjust the current in a way that this voltage remains constant. However, between the charging terminals and the battery electrodes are two series impedances: a) the battery pack contact resistance with the charger terminals and b) the protection circuit between the battery pack terminals and the battery electrodes. When voltage measurements of the battery charger and battery pack terminals are compared to the battery cell electrodes, up to several hundred millivolts are known to be lost. This voltage loss results in a significant increase in the charge time of the battery. It would be desirable therefore to provide an improved method for charging lithium ion batteries which would be able to predict or dynamically measure the loss between the charging terminals and the battery electrodes. This loss term would then be added to the prescribed charging voltage of the particular lithium charging system under charge.

SUMMARY OF THE INVENTION

It is an object of the present invention to provide a battery charger that solves various problems in the prior art.

It is another object of the present invention to identify the optimum voltage levels for recharging various types of batteries, including lithium ion type batteries.

It is a further object of the present invention to automatically compensate for the voltage drop across the terminals of the battery and any protection circuitry.

Briefly, the present invention relates to a battery charger for charging various types of batteries, including batteries requiring constant current and constant voltage charging, such as lithium ion batteries. The battery charger includes a digital to analog converter circuit, used to provide a first voltage measurement across the battery while the battery is being charged and a second voltage measurement across the battery while the charging current is interrupted. A microprocessor determines the potential difference between the first voltage and the second voltage to determine a voltage drop across the terminals of the battery pack. A memory stores an optimum voltage level for charging the rechargeable cell. A digital interface from the microprocessor is used to adjust the charging current to provide the optimum voltage level at the rechargeable cell identified from the memory.

BRIEF DESCRIPTION OF THE DRAWINGS

These and other objects of the present invention will be readily understood with reference to the following specification and attached drawing, wherein:

FIGS. 3A and 3B are a schematic diagrams of the battery charging circuit for the battery charger in accordance with the present invention.

DETAILED DESCRIPTION OF THE INVENTION

Figure 1:
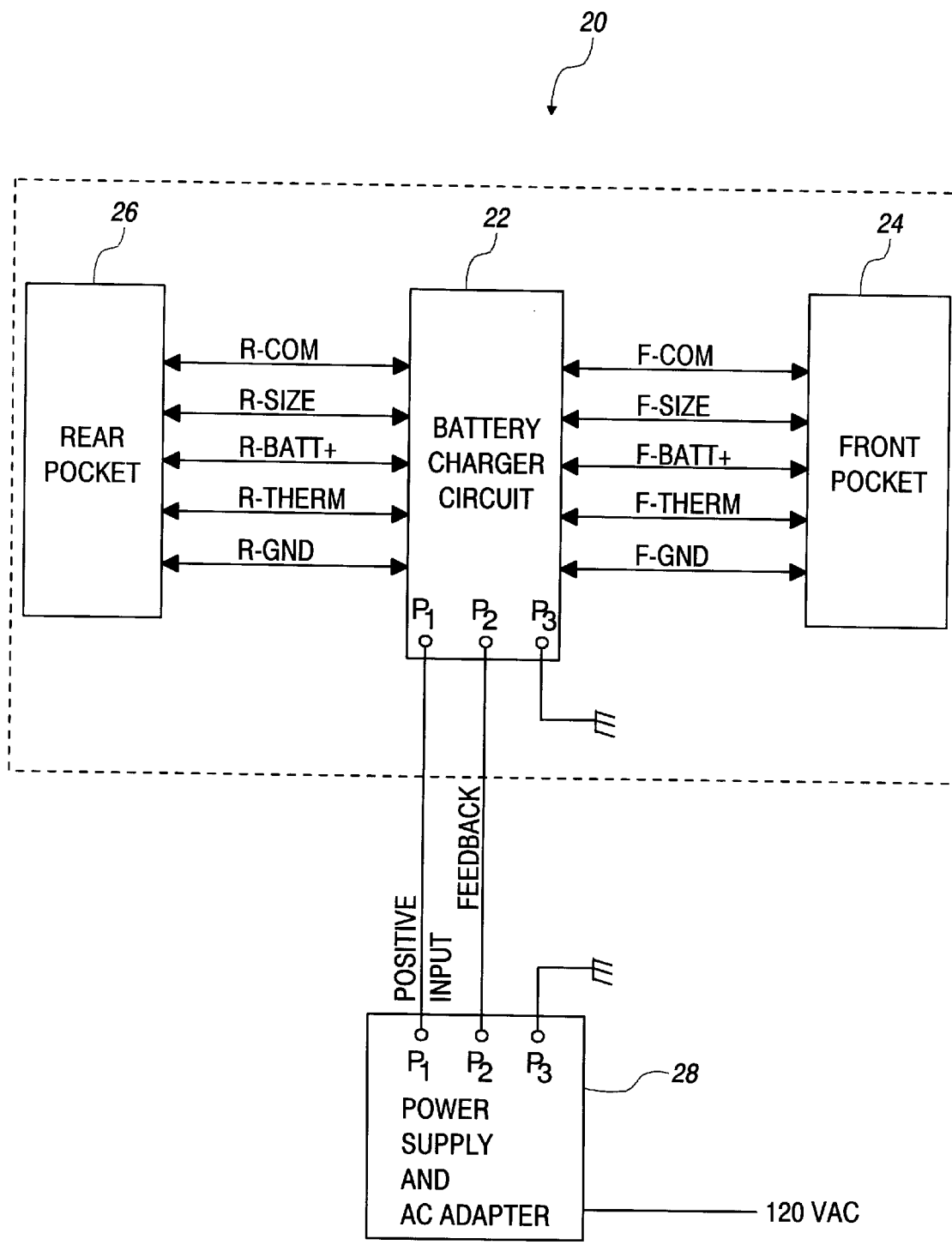
FIG. 1 is a block diagram of the battery charger in accordance with the present invention.

The battery charger in accordance with the present invention is generally identified with the reference numeral 20 and includes a battery charger circuit 22. As shown and illustrated herein, the battery charger 20 includes dual pockets, a front pocket 24 and a rear pocket 26.

An important aspect of the invention is that the battery charger is adapted to charge batteries in both pockets 24, 26 on a time division multiplex basis without waiting for the battery in one pocket to be fully charged. In particular, each pocket 24, 26 is alternatively serviced for a time slice, i.e., 62.5 microseconds. During servicing of the two pockets 24, 26, power dissipation measurements for the power supply 28 and the power transistors $Q_1$ and $Q_4$ (discussed below) are made every interrupt cycle, i.e., 244 μsec. Should the power dissipation of either the power supply or the power transistors $Q_1$ and $Q_4$ exceed acceptable levels, the charging current is controlled to cause the power dissipation to be within acceptable limits, as discussed in detail below.

As used herein, the "F" and "R" prefixes in the signal names refer to the front and rear pockets 24 and 26, respectively. The signals -BATT+ and -GND are used to provide the charging to any modular battery packs installed in the front pocket 24 or rear pocket 26. The battery voltage VBATT of the battery installed in the front and rear pockets 24, 26 is read by way of the -BATT+ signal. Certain batteries require that the rate of change of temperature over time of the battery be maintained within a certain range. Such battery packs are normally provided with a thermistor for the purpose of reading the temperature of the battery pack. As such, both the front pocket 24 and rear pocket 26 are provided with a -THERM signal for reading the thermistor value of the battery packs with integral thermistors. The -COMM and -SIZE signals, provided between the battery charger circuit 22 and the front and rear pockets 24, 26, are used with certain battery packs which provide a signal indicating the size of the battery or with other battery packs that enable bi-directional communication between the battery pack and the battery charger. As will be discussed in more detail below, the battery charger circuit 22 reads the -SIZE and -COMM signals to determine the size and/or type of battery in the front and rear pockets 24 and 26. Normally, only one of these signals, -SIZE or -COMM is provided with a particular battery pack. The -SIZE signal merely identifies the size of the battery to the battery charger circuit 22. The -COMM signal is normally used with battery packs which include an internal memory storage device, such as an electrically erasable programmable read only memory (EEPROM). Such integral EEPROMs are known to be provided with lithium ion modular battery packs which provide various information, including information that the battery is a lithium ion battery.

POWER SUPPLY AND AC ADAPTER

Figure 2A:
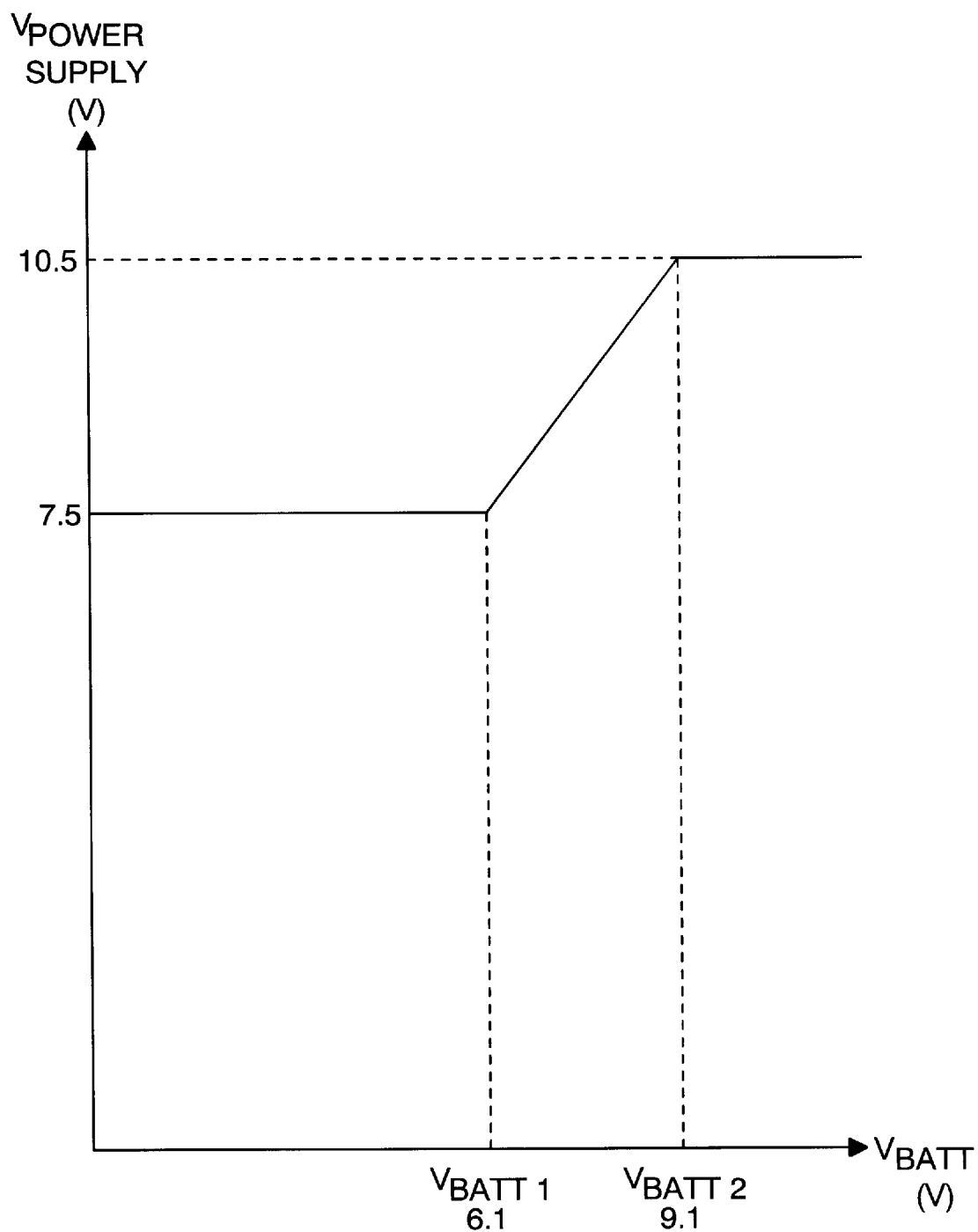
FIG. 2A is an exemplary characteristic diagram for a DC-DC converter for use with the present invention.
Figure 2B:
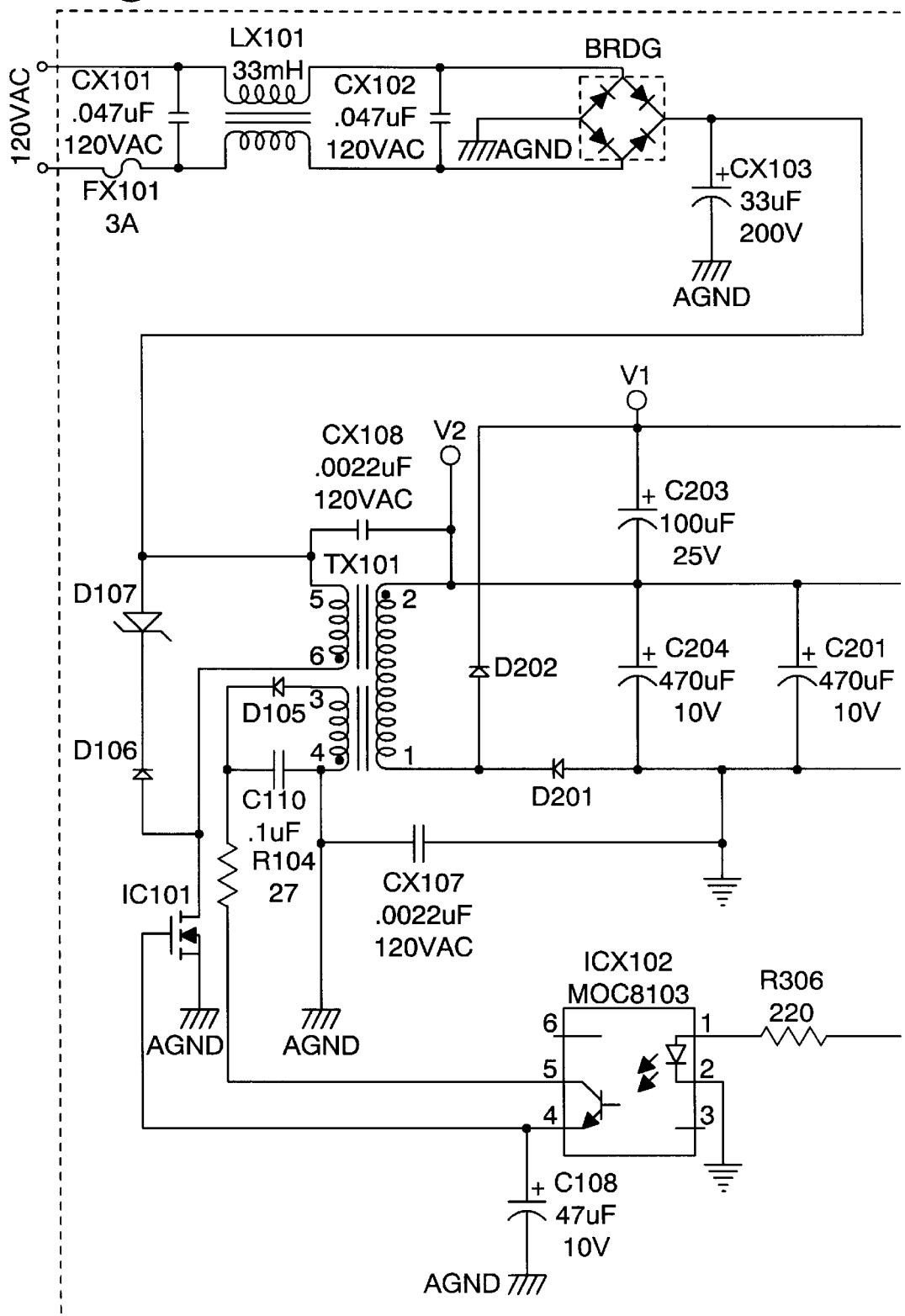
FIGS. 2B and 2C are schematic diagrams of a power supply and AC adapter for use with the present invention.
Figure 2C:
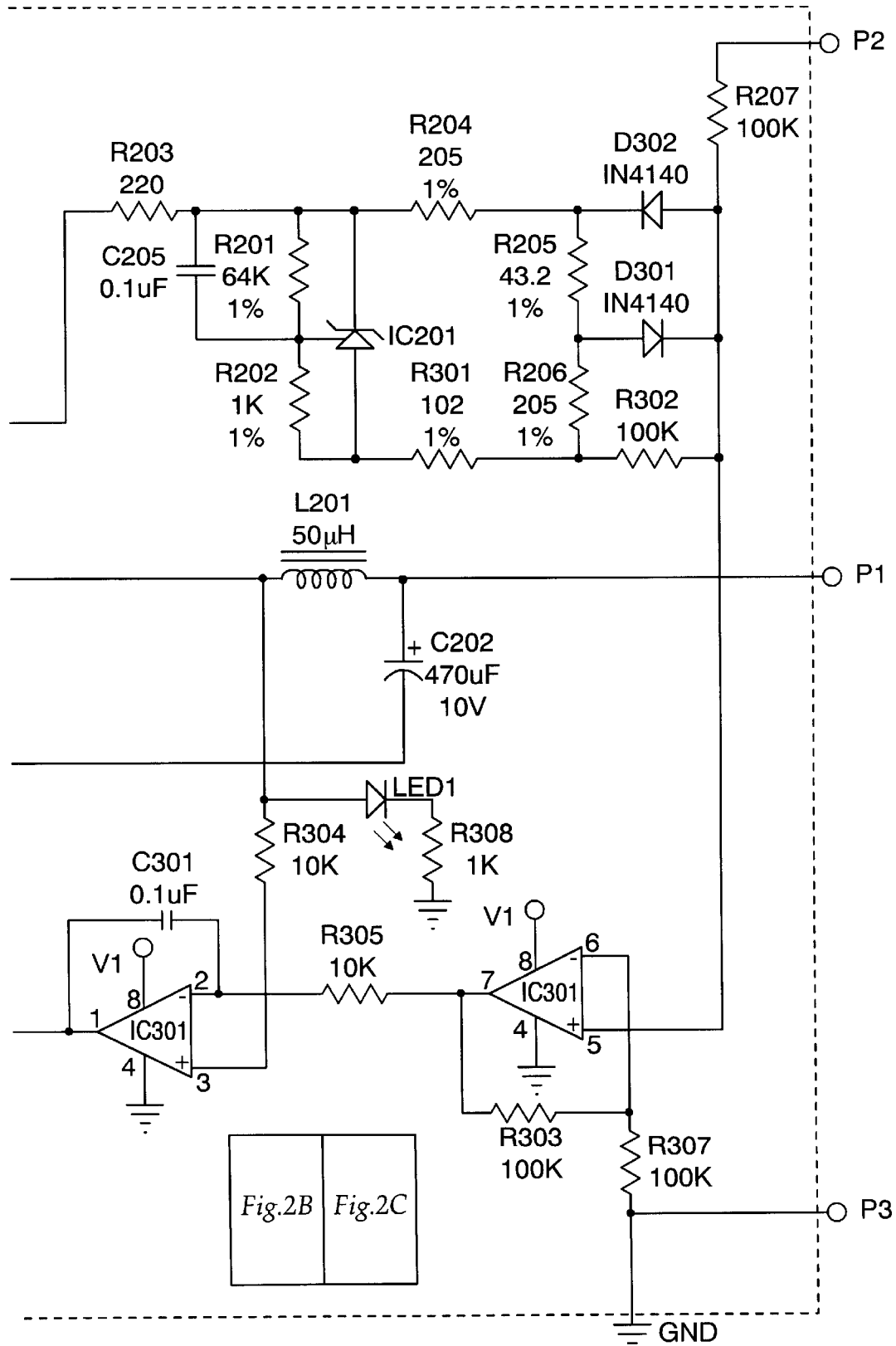

As mentioned above, the battery charger circuit 22 is adapted to be utilized with a power supply 28, for example, a switching or linear power supply, and an AC adapter 28 as illustrated in FIGS. 2B and 2C. For example, the AC adapter may include a transformer LX101 (FIG. 2B) connected to a 120/240 VAC voltage supply. A conventional rectifier BROG, for example, a full-wave bridge rectifier circuit, electrically coupled to the transformer LX101, converts the unregulated AC voltage at the transformer secondary winding to an unregulated DC voltage. The unregulated DC voltage is input to a DC-DC converter circuit as described and illustrated below. Various types of DC-DC converter circuits are suitable for use with the battery charger 20 in accordance with the invention. An exemplary DC-DC converter circuit for use with the present invention is illustrated in FIGS. 2B and 2C.

As shown in FIG. 1, the power supply 28 includes three terminals; $P_1$, $P_2$ and $P_3$. The $P_1$ terminal is used for charging batteries in the front and rear pockets 24 and 26 while the $P_3$ terminal is used for system ground. The $P_2$ terminal is used for monitoring the battery voltage of the batteries installed in the front and rear pockets 24 and 26, respectively. If batteries are installed in both the front and rear pockets 24 and 26, respectively, the battery with the highest voltage will control the operation of the power supply 28. In particular, the battery voltage for the front and rear pockets 24 and 26 is diode ORed by way of the diodes $D_1$ and $D_2$ to the $P_2$ terminal. Thus, the battery with the largest voltage will control the power supply.

FIG. 2A represents an exemplary characteristic diagram for the DC-DC converter circuit illustrating the DC-DC converter circuit voltage (i.e., the output of the power supply 28 on the $P_1$ terminal) on the vertical axis as a function of the highest sensed battery voltage on the horizontal axis. Referring to FIG. ?A, the DC-DC converter circuit provides a constant output voltage $V_1$, for example 7.5 volts, up to a sensed battery of VBATT1, for example 6.1 V. Above a battery voltage of VBATT1, the power supply 28 produces coupled output, adding a fixed voltage, for example 1.4 V to the highest sensed voltage up to a second power supply voltage $V_2$, for example 10.5 volts which corresponds to a battery voltage VBATT2, for example 9.1 volts. Above VBATT2, the power supply maintains a constant output voltage of $V_2$.

BATTERY CHARGER HARDWARE

Figure 3B:
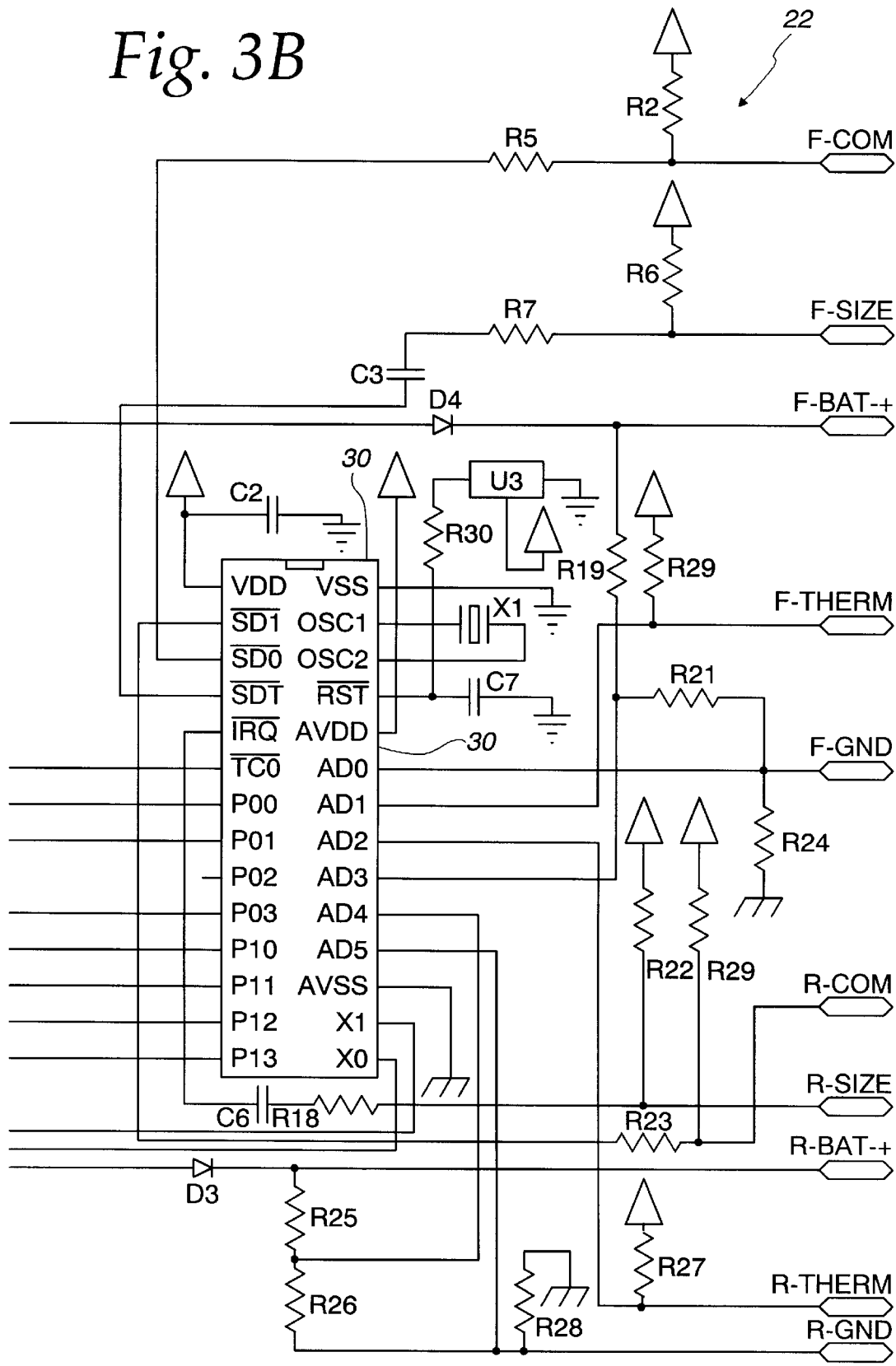

The battery charger circuit 22 is illustrated in FIGS. 3A–3B. The battery charger circuit 22 is shown with circuitry for both a front pocket 24 and rear pocket 26. At the heart of the battery charger circuit 22 is a microcontroller 30. The microcontroller 30 may be a four-bit microcontroller, such as a Panasonic Series MN1500 described in detail in "MN1500 Series Four-Bit, One-Chip Microcomputers Users' Manual", published by Matsushita Electronics Corporation, herein incorporated by reference. Other microcontrollers or microprocessors may also be suitable. The microcontroller 30 includes an on-board 256X4 random access memory (RAM), as well an on-board 4096X8 EEPROM for program instructions. The microcontroller 30 also includes a plurality of programmable input/output ports P00–P13, as well as an internal hardware timer and an on-board analog to digital (A/D) converter with six A/D input/output ports AD0–AD5.

As will be discussed in more detail below, the system is interrupt-driven. In particular, an internal interrupt counter generates interrupts at predetermined time periods to measure various battery parameters, such as battery voltage, current and temperature, for example, every 244 μsec.

In a two-pocket configuration, a time slice is allotted to each pocket 24, 26 (context) so that the batteries in each pocket 24, 26 can be alternatively charged on a time division multiplex basis with constant current or constant voltage, as opposed to known systems where the battery in one pocket is fully charged before any charging begins on the other pocket. In order to prevent overdriving of the battery charger circuit 22, the power dissipation is continuously checked on an interrupt basis. In particular, the battery voltage VBATT is determined by sensing the voltage across the voltage divider circuits R19/R21 and R25/26 and subtracting the voltage across the shunt resistors R24 and R28 for the front and rear pockets 24 and 26, respectively. The sensed battery voltage VBATT is applied to an A–D port on the microcontroller 30. The battery current is sensed by way of the sensing resistors R24 and R28 connected in series with the batteries in the front and rear pockets 24 and 26, respectively. Any time the power dissipation for either of the pockets 24, 26 becomes excessive, the respective power transistors $Q_1$ and $Q_4$ under the control of a pulse width modulator (PWM) are operated to control the power dissipation to an acceptable level.

A plurality of light-emitting diodes, LED1, LED2, LED3, LED4, LED5 and LED6, are provided for each of the front pocket 24 and rear pocket 26. In particular, each pocket 24, 26 is provided with a red, yellow and green LED. These LEDs provide the status of the charging system. The LEDs, LED1, LED2, LED3, LED4, LED5 and LED6 are connected between the various input/output ports on the microcontroller 30 and a power transistor Q3. More particularly, the emitter terminal of the transistor Q3 is coupled to the LEDs, LED1, LED2, LED3, LED4, LED5 and LED6 by way of a plurality of current-limiting resistors, R12, R14, R13, R15, R16 and R17. The collector of the transistor Q3 is coupled to the positive output terminal $P_1$ of the power supply and AC adapter 28. The base of the transistor Q3 is tied high to cause the transistor Q3 to conduct anytime the power supply and the AC adapter 28 is connected to a 120-volt supply.

External power for the microcontroller 30 is developed by a linear regulator VR1, for example, a National Semiconductor Model LM 78L-05LZ, whose input terminal VCC is connected to the positive output P1 of the power supply and AC adapter 28, which provides a 5.0+/−5% VDC supply for both the analog and digital supply terminals AVDD and VDD of the microcontroller 30, as well as an EEPROM 32, discussed below. In order to provide a relatively constant voltage source to the microcontroller 30, a capacitor C1 is tied at the output of the linear regulator R1 and ground. In addition, a second capacitor, C2, is connected between the power supply input VDD and ground. Both the analog and digital ground pins of the microcontroller 30 VSS and AVSS are tied directly to ground.

The microcontroller 30 is an 8 MHz device. The clock signal for the microcontroller 30 may be provided by an 8 MHz crystal connected between its OSC1 and OSC2 pins. The reset pin (RST) is connected to ground by way of a capacitor C7, in order to prevent instantaneous fluctuations in the reset signal. The reset terminal (RST) is also connected by way of a resistor R30 to a device to measure the power supply voltage, such as a Schmitt trigger, for example, as manufactured by Panasonic, Model No. MN1381

The front pocket signals F-COMM, F-SIZE and F-THERM are pulled high by way of pull-up resistors R2, R6, and R20, respectively. The F-COMM signal is applied to a serial input SDO of the microcontroller 30 by way of an input resistor R5. The F-SIZE signal is applied to a serial input pin SDT of the microcontroller 30 by way of an input resistor R7 and a serially coupled capacitor C3. The serial port SDO (or alternatively an I/O port) enables the battery charger circuit 22 to communicate with smart battery packs as discussed above. The F-THERM signal, an analog signal, is tied directly to an A/D input port AD1 of the microcontroller 30.

The battery signals from the rear pocket 26, R-COMM, R-SIZE and R-THERM are connected to the microcontroller 30. In particular, the R-COMM signal is connected to a bidirectional serial communication port SD1 on the microcontroller 30 by way of an input resistor R23. The R-SIZE signal from the rear pocket 26 is connected to an interrupt terminal IRQ on the microcontroller 30, by way of an input resistor R18 and serially coupled capacitor C6.

Charging power is applied to the battery in the pockets 24, 26 by way of the -BATT+ and -GND signals. As such, the $P_2$ terminal of the power supply 28 is connected to the positive battery terminal F-BATT-+ for the front pocket 24 by way of a power transistor Q1F and a diode D4 as well as to the positive battery terminal R-BATT-+ for the rear pocket 26 by way of a power transistor QIR and a diode D3. The negative battery terminal F-GND for the front pocket 24 is connected to ground by way of a current sensing transistor R24 while the negative battery terminal R-GND for the rear pocket 26 is connected to ground by way of a current sensing transistor R28.

The analog battery voltage VBATT for the front pocket 24 may be read by way of the F-BATT+ terminal, connected to an A/D input/output port AD3 of the microcontroller 30 by way of a voltage divider consisting of the resistors R19 and R21 . Similarly, the analog battery voltage VBATT for the rear pocket 26 may be read by the R-BATT-+ terminal by way of a voltage divider consisting of the resistors R25 and R26, applied to the A/D input/output port AD4. As mentioned above, the system is interrupt-driven and as such the microcontroller 30 may read various parameters including the battery voltage VBATT, as well as the battery temperature BATT TEMP and charge current, every interrupt cycle, for example 244 μsec for both the front pocket 24 and rear pocket 26, which enables batteries with different charging characteristics to be charged at the same time.

Power to the batteries in the front and rear pockets 24, 26 is under the control of a pair of power transistors Q1 and Q4, by way of a pair of diodes D4 and D3, respectively. The diodes D4 and D3 prevent the batteries from backfeeding the circuitry during noncharging conditions. The power transistors Q1 and Q4 are under the control of a pair of pulse width modulators (PWM). The PWM for the front pocket 24 includes a transistor Q2, a capacitor C4 and a pair of resistors R8 and R9 which drives the power transistor $Q_1$. The collector of the transistor Q2 controls the power transistor Q1F for the front pocket 24. The PWM for the rear pocket 26 includes a transistor Q5, a capacitor C5 and a pair of resistors R1 and R10. The collector for the transistor Q5 controls the power transistor for the rear pocket 26.

Both PWMs operate in real time and operate in essentially the same manner. Thus, only one PWM will be described. Both PWMs are driven by the microcontroller 30 and in particular the terminals X0 and X1, which, as used herein, is an input/output port. These outputs of the I/O ports X0 and X1 are applied to the PWMs for the front and rear pockets 24 and 26 respectively. In particular, the output of the PWMs is applied to the base of the transistors Q2 and Q5 by way of current limiting resistors R9 and R11 for the front and rear pockets 24 and 26, respectively.

The collector current of the PWM transistors Q2 and Q5 is used to control the operating region of the power transistors Q1F and Q1R. The collector current of the PWM transistors Q2 and Q5 is under the control of the RC circuit, connected between the emitter and base terminals. When the I/O port $X_0$, $X_1$ is high, the RC circuit begins charging and discharging if the I/O part of $X_0$, $X_1$ is low as function of the and its RC time constant. For exemplary values of the resistors R8 and R10 of 100 ohms exemplary values for the capacitors C4 and C5 of 10 μf, the time constant will be approximately 0.001 seconds. By selecting a relatively long time constant relative to the interrupt period 244 μsec, the PWM transistors Q2 and Q5 as well as the power transistors Q1F and Q1R will conduct all the time. The transistors Q1F, Q1R, Q2 and Q5 thus operate in the linear region to control the power transistors $Q_1$ and $Q_4$ to provide either constant current or constant voltage charging. More particularly, the battery voltage VBATT and charging current IBATT are continuously monitored as discussed above. The PWMs control the power transistors Q, and $Q_4$ to maintain either a constant voltage or constant current.

In order to avoid the need to use precision components, an EEPROM 32 is provided and used for storing calibration constants for the standard tolerance components used in the circuit. The EEPROM 32 may be a Xicor, for example, Model 24 with 16 bytes of storage space. As will be indicated in more detail below, one byte of the EEPROM 32 is provided with a unique identifying number to indicate whether the calibration constants have been downloaded to the EEPROM 32.

BATTERY CHARGER SOFTWARE

The flow diagrams for the microcontroller 30 are illustrated in FIGS. 4 through 15. For a two-pocket battery charger, the system treats the pockets independently. In particular, a flag is set for the active pocket to enable measurements and charging to be done for that pocket. Once the measurements and charging for the active pocket are complete, the flag is reset for that pocket and set for the other pocket to enable measurements and charging to be done for the other pocket.

There are various active states of the battery charger. Since the measurements and charging of both pockets is virtually identical, the active states are discussed for a single pocket battery charger.

POWER-UP STATE

Figure 4:
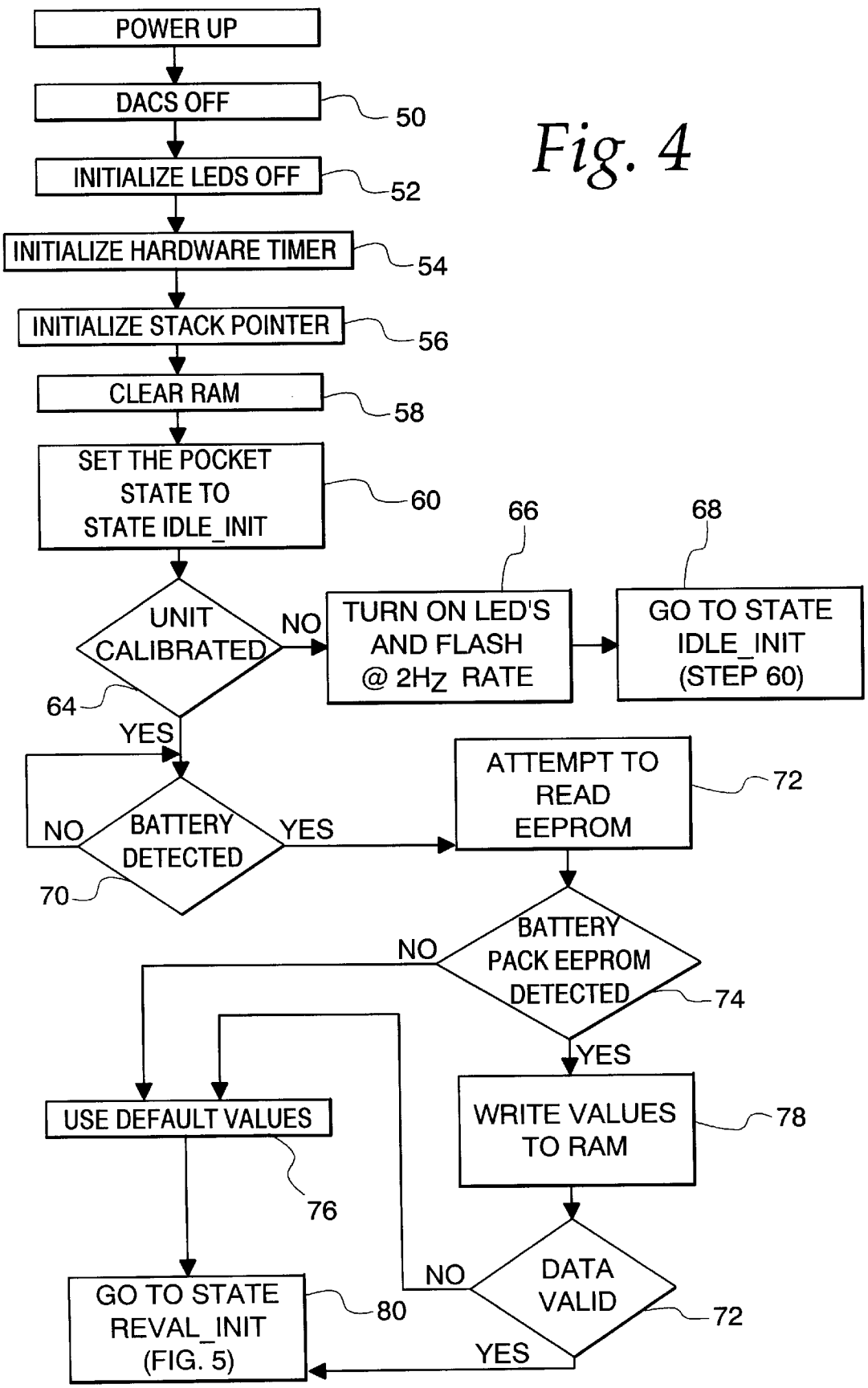
FIGS. 4–15 are flow diagrams for the battery charger in accordance with the present invention.

Referring first to FIG. 4, the power-up routine is illustrated. Initially, on power-up, the PWM transistors Q2 and Q5 are turned off by way of the microcontroller 30. By turning off the PWM transistors Q2 and Q5, the power transistors Q1 and Q4, respectively, are turned off which, in turn, cuts off battery charging current to both the front and rear pockets 24, 26, as illustrated in step 50. In addition to turning off the charging current to the front and rear battery pockets 24, 26, the LEDs, LED1, LED2, LED3, LED4, LED5 and LED6 for the front and rear pockets 24, 26 are initialized and turned off in step 52.

As will be discussed in more detail below, measurements of the battery voltage current and temperature are taken on an interrupt basis every predetermined time interval. As such, the microcontroller 30 includes an internal interrupt counter, set to interrupt the microcontroller 30 at predetermined time periods, for example, every 244 μsec. At each interrupt period, the microcontroller 30 reads various parameters for both of the front and rear pockets 24, 26 including the battery voltage, battery current and battery temperature. At power-up, the interrupt counter is initialized to zero in step 54.

The EEPROM 32 for the calibration constants is write-disabled during initialization. Also, the A/D ports, AD0–AD5, used for converting the battery parameters to digital values, are set to be inputs. The stack timer, as well as the internal RAM within the microcontroller 30, are also initialized in steps 56 and 58. After power-up, the battery charger circuit 22 goes through various states, as discussed below.

IDLE_INIT STATE

After power-up, the system goes into the idle-initiate state IDLE_INIT, as indicated in step 60. In this state, the battery charger reads various calibration constants for the various types of batteries from an EEPROM 32. In addition to the calibration constants, the EEPROM 32 also includes a unique number which indicates whether or not the calibration constants have been loaded into the EEPROM 32. Thus, in step 64, a predetermined byte, for example, the first byte which contains the unique number, is read. If the unique number is not found within the EEPROM 32, the system assumes that the EEPROM 32 does not include the calibration constants and proceeds to step 66. In step 66, the LEDs, LED1, LED2, LED3, LED4, LED5 and LED6 are flashed at the a 2 Hz rate to indicate that the system EEPROM 32 does not contain the calibration constants. Subsequently, in step 68, the system returns to step 60.

If the EEPROM 32 is found to include the calibration constants, the system proceeds to step 70 to determine if a battery has been detected in either the front pocket 24 or rear pocket 26. As mentioned above, the microcontroller 30 includes an interrupt counter which initiates detection of various battery parameters, including the battery voltage, current and temperature for both the front pocket 24 and rear pocket 26, every predetermined time period, such as 244

μsec. If no battery is detected, the system loops back to step 70 until a battery is detected. Once a battery is detected, a battery detection flag is set and the system attempts to read the EEPROM 32 in step 72. The first step in reading the EEPROM 32 is detecting the EEPROM 32 itself in step 74. If no EEPROM 32 is detected, the system goes to step 76 and utilizes default values. If an EEPROM 32 is detected, the constants are written to the on-board RAM on the microcontroller 30 in step 78. Once the values are written to the RAM, the data is analyzed in step 79 to determine if it is valid, for example, by way of a checksum. If not, the system loops to step 76 and uses default values. If the data is valid, the system goes to the pocket state REVAL_INIT in step 80.

REVAL_INIT STATE

Figure 5:
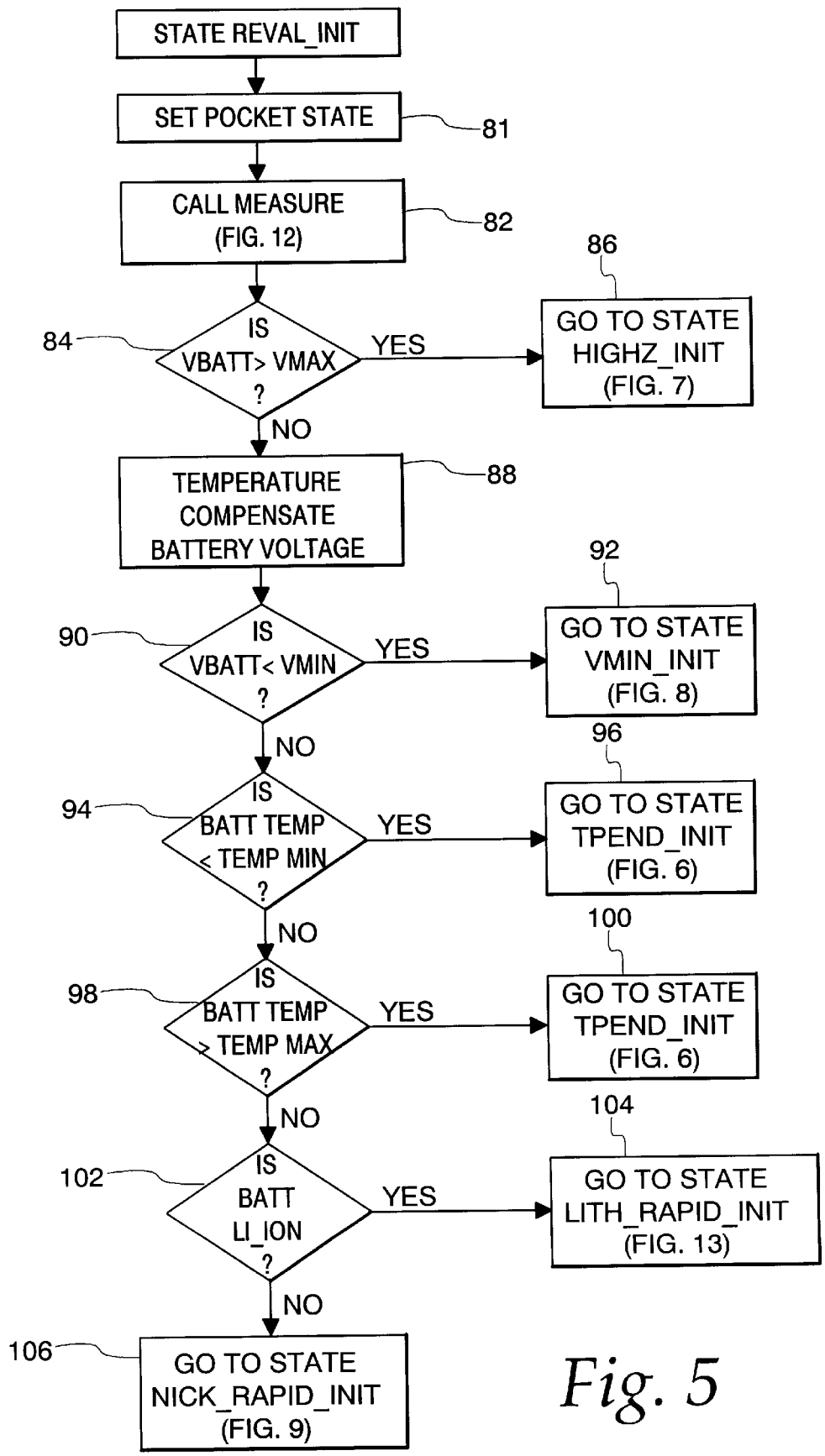

The state REVAL_INIT is illustrated in FIG. 5. Initially, in the REVAL_INIT state, the pocket state is set in step 81, after which the system calls a subroutine MEASURE (FIG. 12) which measures the battery parameters in the preselected interrupt intervals and stores them in the microcontroller 30 RAM in step 82 as well as other battery information including the battery size and type. These values are then compared with table values stored in the on-board EEPROM on the microcontroller 30 for the type of battery detected in the pocket. More particularly, the system checks to determine whether the battery voltage VBATT, as measured, is greater than VMAX, a value loaded into the EEPROM of the microcontroller 30 in step 84, indicating maximum voltage for the particular type battery. If so, the system proceeds to a pocket state HIGHZ_INIT in step 86.

If the battery voltage VBATT is less than the stored maximum value VMAX, the system next utilizes the calibration constants from the EEPROM 32 to provide temperature compensation of the measured battery voltage value VBATT in step 88. Subsequently, the system determines in step 90 if the battery voltage VBATT is less than a stored value VMIN, the minimum stored battery value. If so, the system proceeds to a pocket state VMIN_INIT in step 92. If not, the system proceeds to step 94, where the minimum stored temperature value TEMP MIN is compared with the measured value BATT TEMP. If the measured battery temperature value BATT TEMP is less than the stored value TEMP MIN, the system proceeds to a pocket state TPEND_INIT in step 96. If not, the system checks in step 98 whether the measured battery temperature BATT TEMP is greater than a maximum stored value TEMP MAX. If so, the system goes to state TPEND_INIT in step 100. If the battery temperature is less than the stored value for TEMP MAX, indicating maximum temperature for the battery, the system next checks in step 102 to determine if the battery is a lithium ion battery. More particularly, lithium ion battery packs normally include an internal EEPROM, which include data which indicates that the battery is a lithium ion type. As mentioned above, such data from the battery pack EEPROM is stored in state IDLE_INIT. If so, the system proceeds to a lithium rapid initiation state in step 104. If not, the system assumes that the battery is a nickel metal hydride (NiMH) or a nickel cadmium (NiCd) battery, which merely require constant current charging in step 106 and proceeds to a NICK_RAPID_INIT state.

TPEND_INIT STATE

Figure 6:
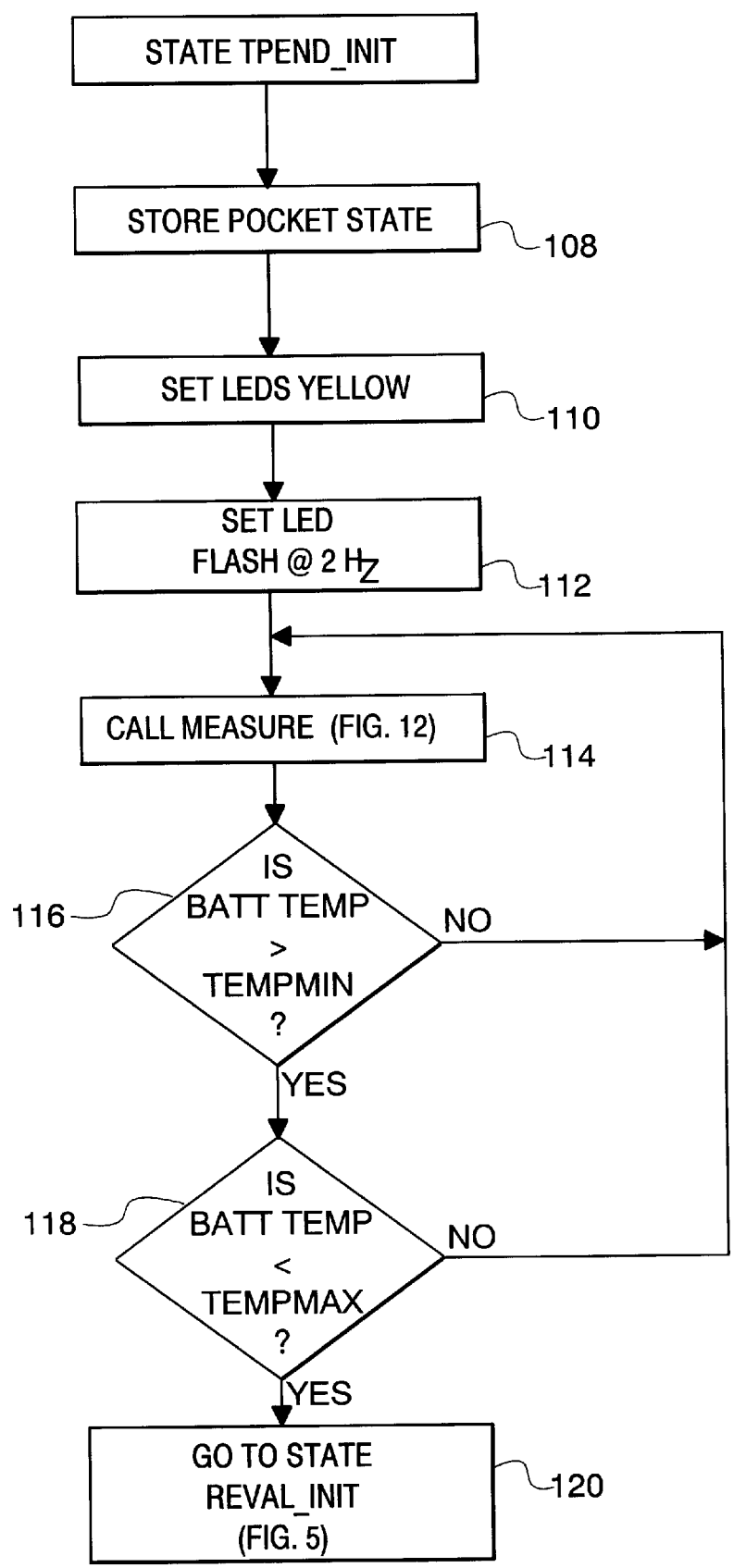

The TPEND_INIT pocket state is illustrated in FIG. 6. As indicated above, the system enters the TPEND_INIT state from steps 94 or 98, depending on whether the measured battery temperature BATT TEMP is less than the minimum TEMP MIN or greater than the maximum temperature TEMP MAX, stored in the on-board EEPROM in the microcontroller 30. The system remains in this state until the measured battery temperature BATT TEMP is within the proper limits (i.e., TEMP MIN<BATT TEMP<TEMP MAX). In order to provide relative stable operation of the system, hysteresis may be provided around the temperature constants such as TEMP MIN and TEMP MAX.

Initially, in step 108, the pocket state of the battery charger 22 is stored. After the state of the battery charger 22 is stored, the system sets the yellow LEDs LED2 or LED5, depending on the measured temperature in the particular pocket, front 24 or rear 26, in step 110. In step 112, the yellow LEDs are flashed at a 2 Hz rate to indicate that the measured battery temperature, either for the front 24 or rear pocket 26, is out of the proper temperature operating range. After flashing the yellow LEDs, LED2 and LED5, the system continues checking battery measurements of the front 24 and rear pocket 26, in step 114 by way of the MEASURE subroutine, discussed below. The system checks, in step 116, to determine if the measured battery temperature BATT TEMP is greater than the minimum temperature TEMP MIN. If not, the system continues reading battery temperature BATT TEMP until the measured battery temperature BATT TEMP is greater than the minimum recommended battery temperature TEMP MIN. Once the measured battery temperature BATT TEMP is found to exceed the minimum temperature TEMP MIN, the system next checks in step 118 to determine if the measured battery temperature BATT TEMP is less than the maximum temperature TEMP MAX. If not, the maximum temperature of the battery is assumed to be exceeded and the system stays in the loop, checking the measured temperature BATT TEMP until the measured battery temperature BATT TEMP drops down below the maximum temperature TEMP MAX. If the measured temperature BATT TEMP is found to be less than the temperature maximum TEMP MAX measured in step 118, the system returns to the REVAL_INIT state in step 120, as discussed above.

HIGHZ_INIT STATE

Figure 7:
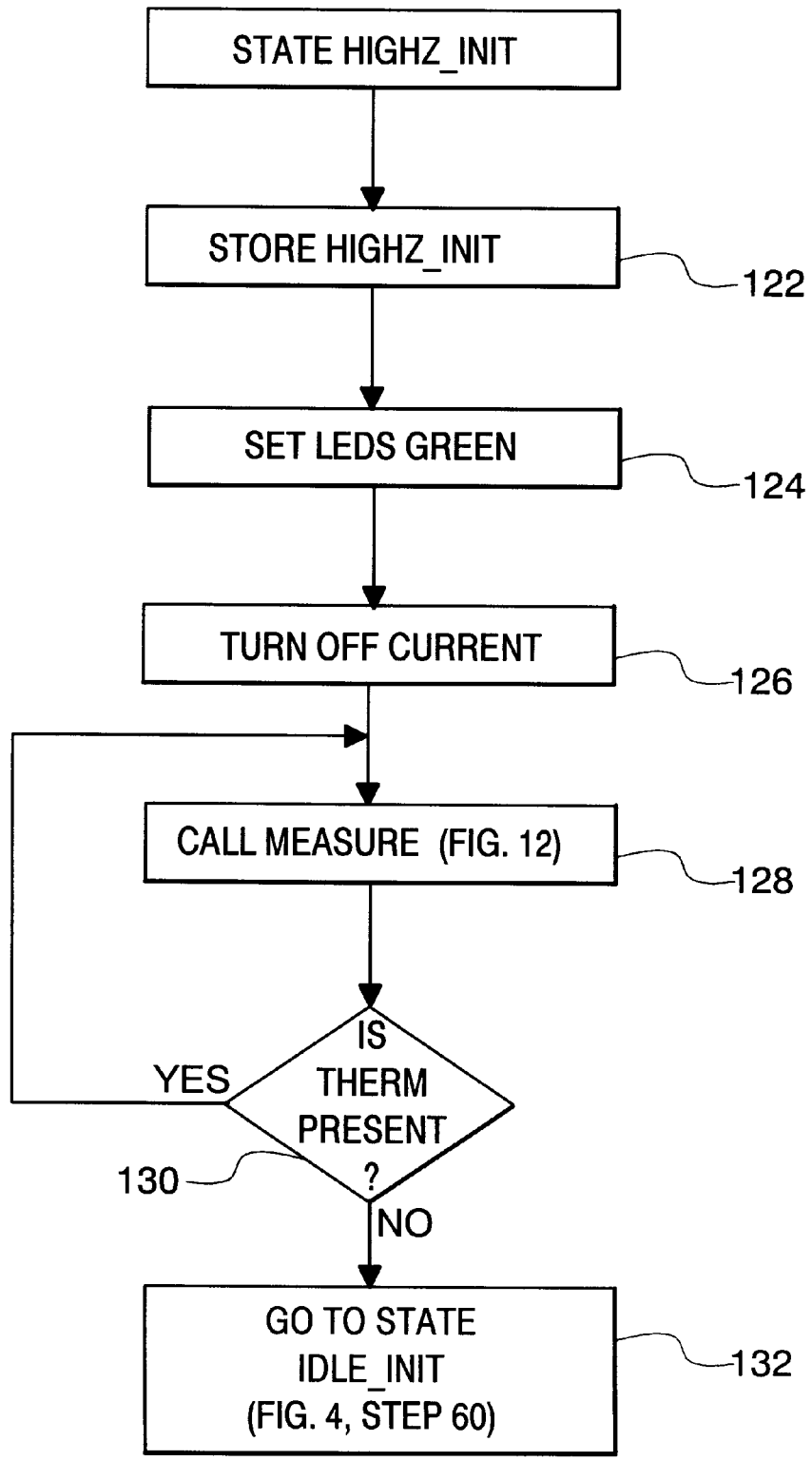

The HIGHZ_INIT state is illustrated in FIG. 7. As indicated above, the battery charger 20 enters this state when the measured battery voltage VBATT is found to be greater than a maximum voltage VMAX. In this state, the system initially sets the pocket state as the HIGHZ_INIT state in step 122. After the pocket state is set, the green LEDs, LED3 and LED6, are set in step 124, to indicate that the battery voltage VBATT is greater than the maximum voltage VMAX. Since the measured battery voltage VBATT exceeds the maximum battery voltage VMAX recommended, all charging current to the active pocket 24, 26 is turned off in step 126 by turning off the respective PWM transistors Q2 and Q5, which, in turn, turns off the series power transistors Q1F and Q1R, respectively. After the current to the active pocket 24, 26 is turned off, the system continues to make temperature measurements as long as a battery pack is disposed in either the front or rear pocket 24, 26, respectively. Once the system determines in step 130 that a battery pack is no longer contained in either the front pocket 24 or rear pocket 26, the system goes to the state IDLE_INIT, as discussed above.

As discussed below, the determination of whether a battery pack is available in either the front or rear pocket 24, 26, is made by making voltage measurements and comparing these measurements with the values stored in the EEPROM on board the microcontroller 30. Should these values indicate no battery is present, the system will return to the IDLE_INIT state, awaiting another battery pack to be inserted into the battery charger 20 in step 132.

VMIN STATE

Figure 8B:
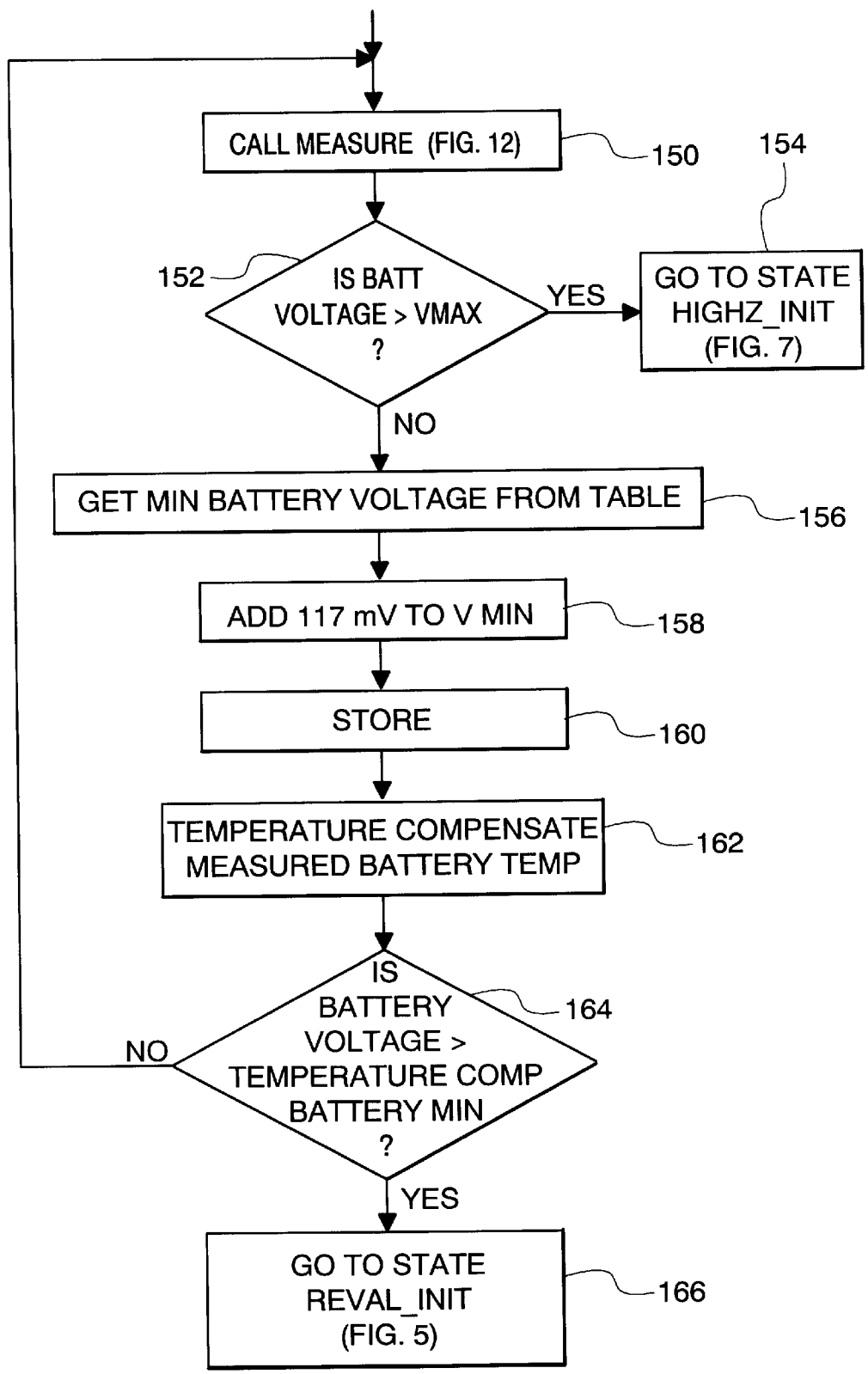

The VMIN_INIT state is illustrated in FIGS. 8A and 8B. As indicated above, the system goes to the VMIN state any time the measured battery voltage VBATT is determined to be less than a minimum voltage VMIN. When the battery is in such a state, the battery charger state is stored in step 134 and the battery is first preconditioned with a trickle charge before entering into a fast charge state in order to avoid damage to the battery. In this state, the yellow LEDs, LED2 and LED5, are flashed at a 2 Hz rate in step 138. Subsequently, in step 140, the maximum voltage VMAX, from the table in the EEPROM on board the microcontroller 30 is stored in the on-board RAM in step 142. Subsequently, in step 144, the trickle current value from the table is obtained in step 144 and stored in step 146. In step 148, the system is set to trickle charge the battery in either the front pocket 24 or rear pocket 26 by way of control of the PWM driver transistors Q2 and Q5, which, as mentioned above, drive the power transistors Q1 and Q4 to supply the trickle charge current to battery packs disposed in the front or rear pockets 24, 26, respectively. In step 150, the measured battery parameters are stored in the on-board RAM on the microcontroller 30. The measured battery voltage VBATT is compared with the maximum voltage VMAX for the battery in step 152. If the measured battery voltage VBATT is greater than the maximum voltage VMAX, the system goes to the HIGHZ_INIT state in step 154, as discussed above. If the measured battery voltage VBATT is determined not to be greater than the maximum voltage VMAX, the system proceeds to step 156 and obtains the minimum battery voltage VMIN from the table. In order to avoid cycling, hysteresis is added by adding a predetermined number, for example, 117 mV, to the minimum voltage value VMIN in step 158. The new value is stored in step 160. In step 162, the measured battery value VBATT is temperature compensated by way of a parameter value retrieved from the battery EEPROM or default tables. Subsequently, the temperature-compensated battery voltage VBATT is compared with the minimum voltage to determine if the battery voltage VBATT is greater than the temperature-compensated minimum battery voltage in step 164. If so, the system proceeds to the pocket state REVAL_INIT (FIG. 5). If not, the system returns back to step 150 and continues trickle charging the battery and checking the battery voltage VBATT. Once the measured battery voltage VBATT becomes greater than the minimum battery voltage, the system goes to step 166, which returns to REVAL_INIT state.

NICK_RAPID_INIT STATE

Figure 9A:
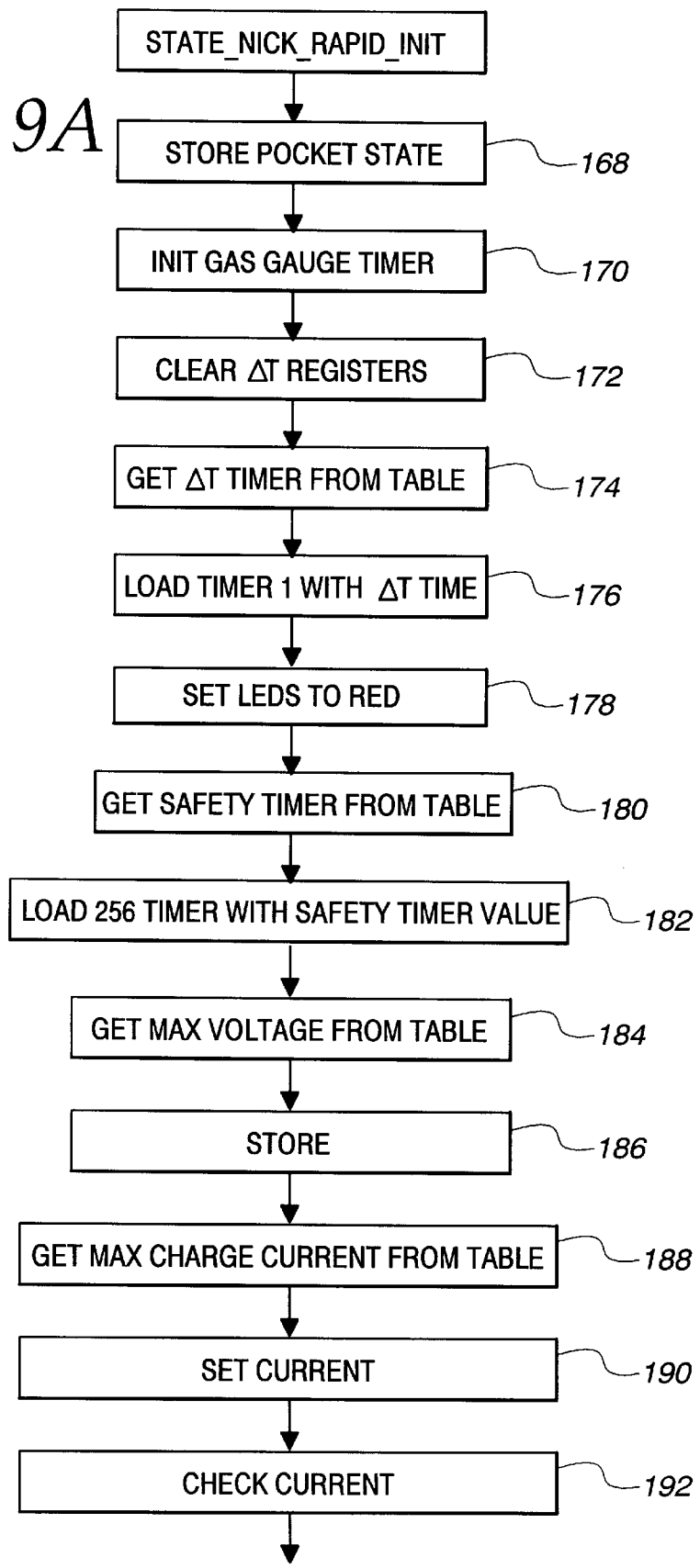
Figure 9B:
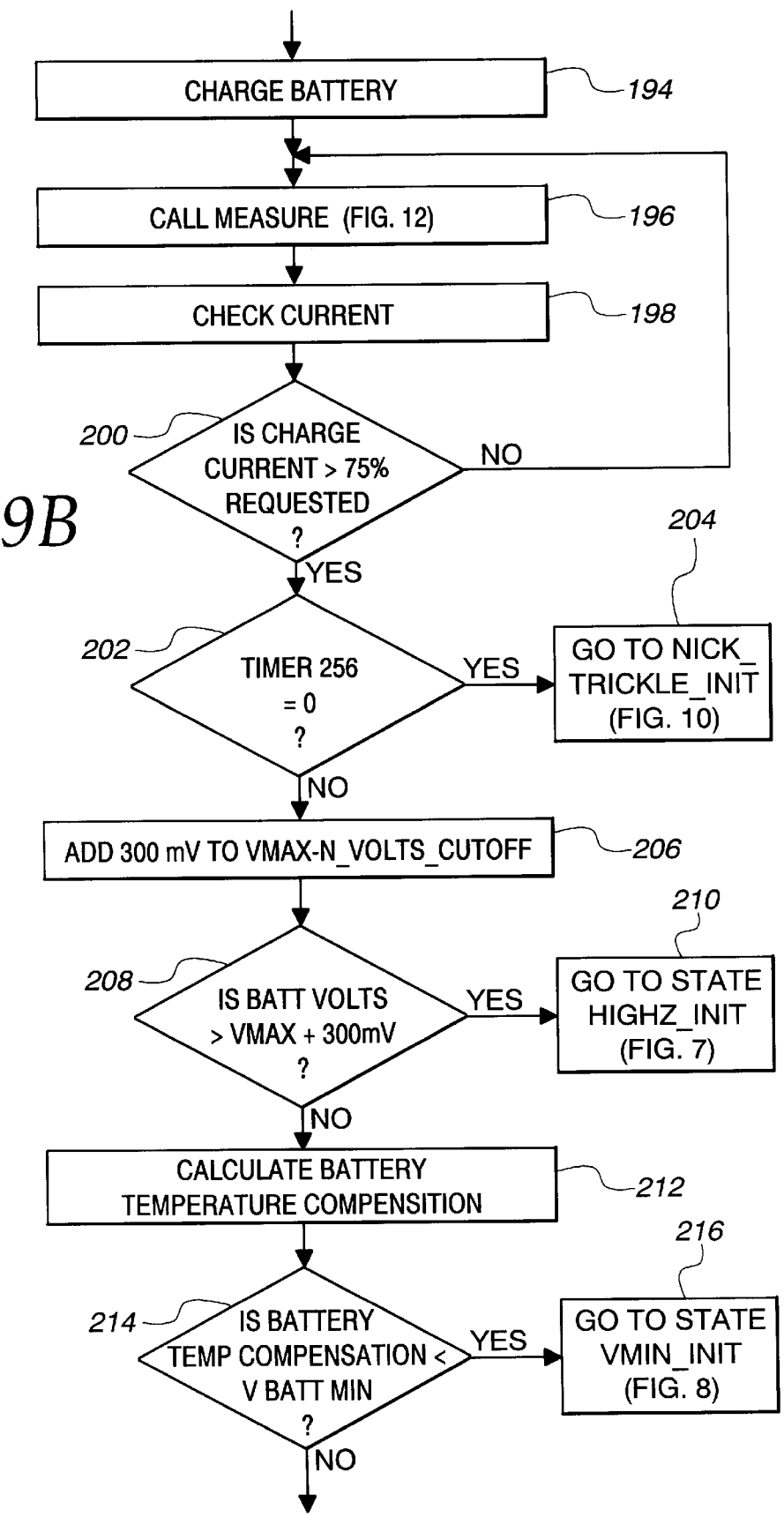
Figure 9C:
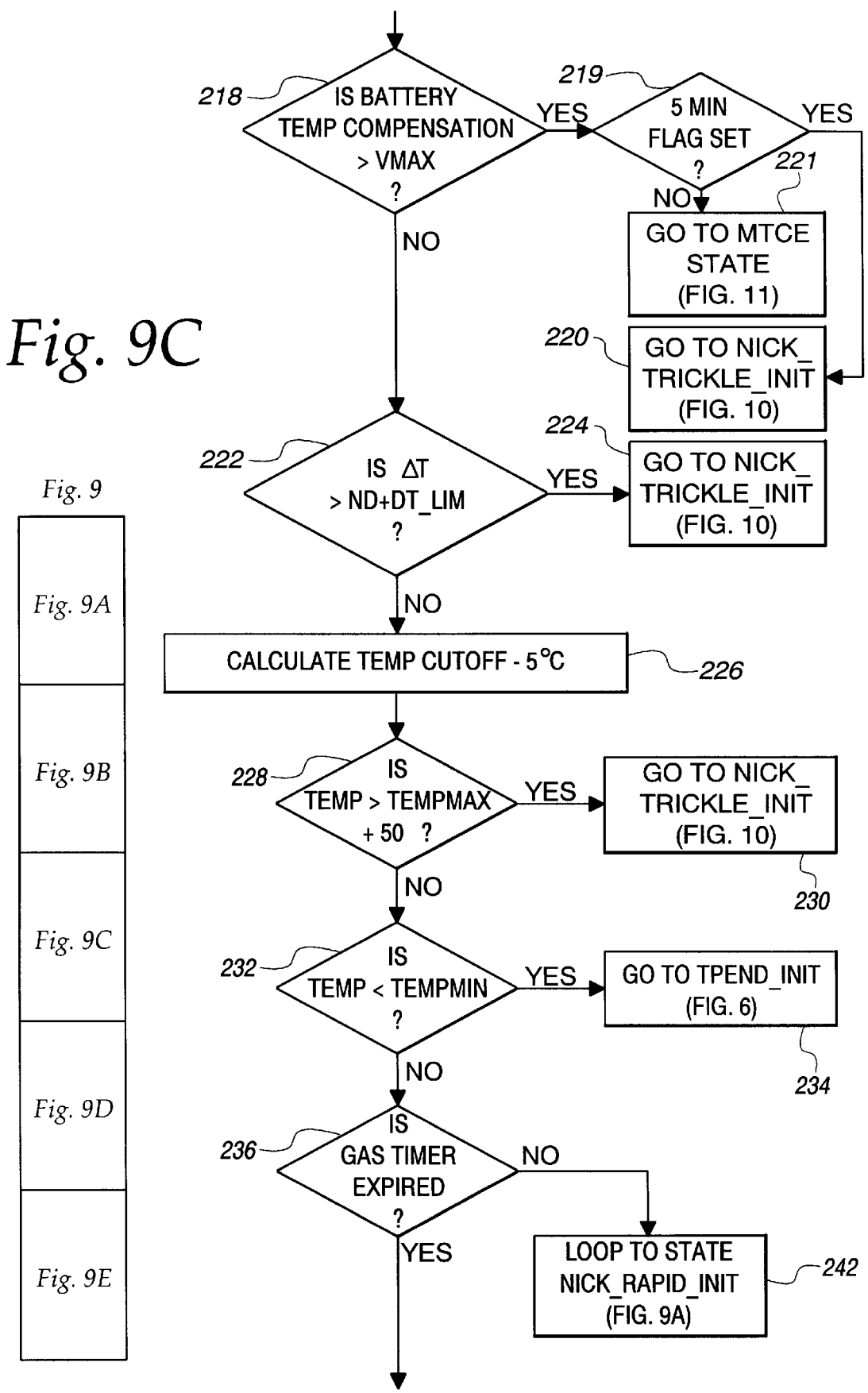

The flow diagram for rapid charging for nickel cadmium (NiCd) and nickel metal hydride (NiMH) batteries is identified as NICK_RAPID_INIT and is shown in FIGS. 9A, 9B and 9C. In this state, once the system determines that the battery in either the front pocket 24 or rear pocket 26 is not a lithium ion battery, the system goes to the NICK_RAPID_INIT state, assuming that the battery temperature BATT TEMP is less than the maximum temperature TEMP MAX. In this state, the pocket state is initially set as the NICK_RAPID_INIT state, indicating rapid charge for nickel metal hydride (NiMH) and nickel cadmium (NiCd) batteries in step 168.

In addition to the hardware interrupt counter discussed above, the system utilizes three software timers: a gas gauge timer; a ΔT timer and a safety timer. The gas gauge timer is used for timing both rapid and trickle charging of batteries requiring constant current charging, such as nickel cadmium and nickel metal hydride batteries. The stored charging values are retrieved for such batteries to cause the batteries to be charged at the stored values. After the pocket state is stored, the gas gauge timer within the microcontroller 30 is initiated in step 170. After the gas gauge timer is initiated in step 170, a plurality ΔT registers in the microcontroller 30 are cleared in step 172. Since both nickel metal hydride (NiMH) and nickel cadmium (NiCd) batteries are subject to a maximum temperature change per unit of time, stored ΔT timer values are retrieved from the table in step 174 and loaded into the ΔT timer in step 176. After the ΔT timer is initiated with the ΔT timer value, the red LEDs, LED1 and LED4, are set in step 178. The safety timer is set, for example, to a relatively long period, for example, a few hours. The safety timer returns the battery to a trickle charge after a predetermined time period irrespective of the rate of change of temperature with time of the battery. Thus, in step 180, the time period for the safety timer is retrieved from the table in step 180 and loaded into the safety timer in step 182. Subsequently, in step 184, the maximum allowable voltage VMAX is obtained from the table in step 184 and stored in 186. The maximum charging current IMAX is obtained from the table in step 188 and used in step 190 for setting the PWM control circuits, which, in turn, control the power transistors Q1 and Q4 for controlling charging current to the front and rear pockets 24, 26. The current is checked in step 192. Subsequently, in step 194, the system charges the battery with the current IMAX. The system then measures the current in step 196 to determine if the charging current required by the rapid charge can be delivered by the system. Thus, in step 200, the system checks whether the charge current is 75% of that requested. If not, the system continues looping until the system can deliver at least 75% of the required rapid charge current. Should the system decide in step 200 that at least 75% of the required rapid charge current can be delivered to either the front or rear pockets 24, 26, the system proceeds to step 202 and checks the safety timer. If the safety timer has expired, the system goes to step 204 and goes to the NICK_TRICKLE_INIT state for trickle charging both nickel metal hydride (NiMH) and nickel cadmium (NiCd) batteries. If the safety timer has not expired, a predetermined value, for example, 300 mv, is added to the maximum voltage VMAX for the battery in step 206 to generate a cut-off voltage value CUT-OFF_VOLTS. Subsequently, in step 208, the system checks if the battery voltage is greater than VMAX, the cut-off voltage CUT-OFF_VOLTS. If so, the system goes to the HIGHZ state in step 210. If not, the system proceeds to step 212 where the battery temperature compensation is determined for the measured battery voltage. In step 214, the system determines whether the temperature-compensated battery voltage determined in step 212 is less than the minimum battery voltage VMIN. If so, the system proceeds to step 216 to the VMIN_INIT state. If not, the system goes to step 218 and checks whether the temperature-compensated battery voltage value is greater than VMAX. The system then checks in step 219 whether the safety timer five minute flag has been set. If so, the system goes to the maintenance state MTCE (FIG. 11) in step 221. If not, the system goes to step 220 to the NICK_TRICKLE_INIT state for trickle charging both nickel metal hydride (NiMH) and nickel cadmium (NiCd) batteries. If not, the system goes to step 222 which checks whether the rate of change of table. If so, the system goes to step 224 to the NICK_TRICKLE_INIT state. If not, the temperature cut-off is determined in step 226. The system next checks in step 228 to determine if the battery temperature BATT TEMP is greater than the maximum temperature TEMP MAX. If so, the system goes to the trickle charge state NICK_TRICKLE_INIT in step 230. If not, the system checks in step 232 whether the measured temperature BATT TEMP is less than the minimum temperature TEMP MIN. If so, the system goes to the TPEND_INIT state in step 234. If the measured temperature BATT TEMP is not less than the minimum temperature TEMP MIN, the gas gauge timer is checked in step 236. If the gas gauge timer is not timed out, the system continues with rapid charging and proceeds to step 242. Otherwise, the system does gas gauge checking as illustrated in FIGS. 9D and 9E.

Figure 9D:
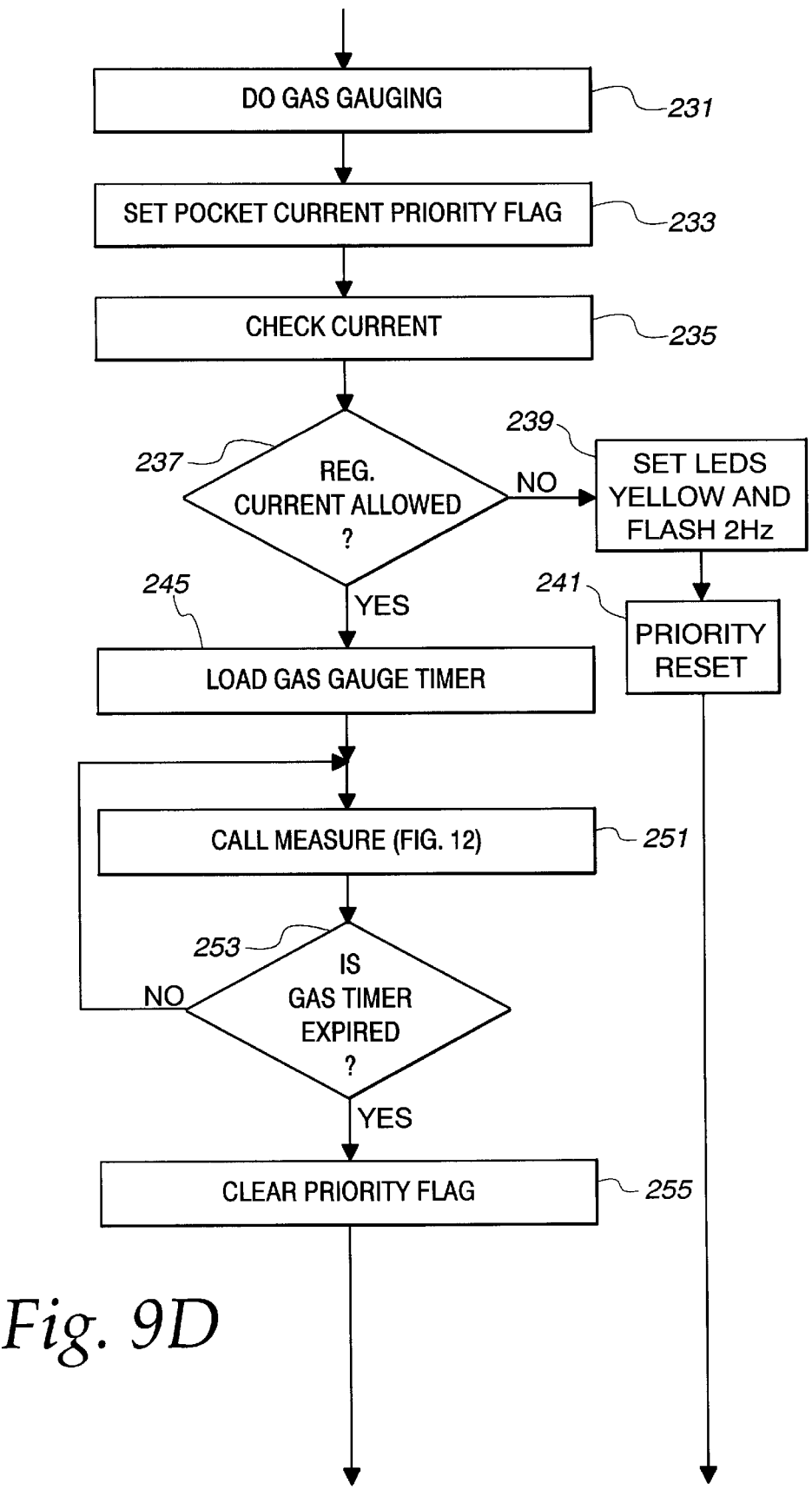
Figure 9E:
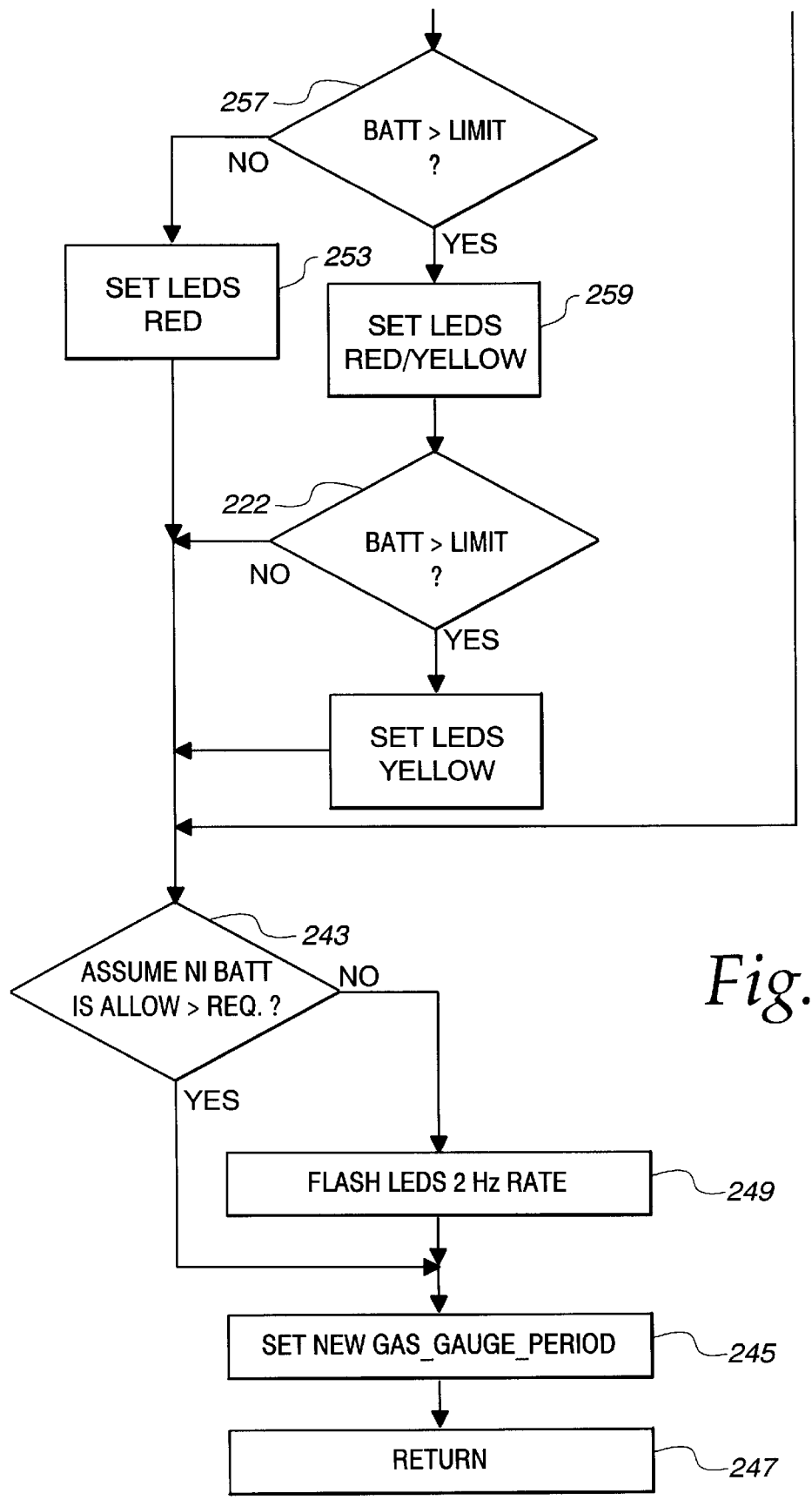

Referring to FIG. 9D, the gas gauge checking is initiated in step 231 by checking and calculating the allowable current to prevent damage to the power supply and to the power transistors $Q_1$ and $Q_4$. In particular, power dissipation of the power supply 28 and the power transistors $Q_1$ and $Q_4$ is checked. The power supply 228 may have an exemplary 850 milliamp maximum while the power transistors $Q_1$ and $Q_4$ may be subject to an exemplary 2-watt power dissipation limit. The maximum power dissipation levels (i.e., maximum battery current) is compared with a table value from the EEPROM 32 during gas gauge periods.

In step 233, a pocket priority flag is set. After the pocket priority flag is set, the system determines in step 235 whether the required charging current will exceed the maximum allowable current of the power supply 228. If not, the yellow LEDs are set to flash at a 2 hertz rate in step 239. Additionally, the priority flag is cleared in step 241. Once the priority flag is set, the other pocket is kept off as discussed above. The system then proceeds to step 243, assuming nickel type battery compares maximum allowable current for the power supply 28 with a value representative of seventy five percent (75%) of the required current to the active pocket. In other words, if the allowable current from the power supply 28 is greater than seventy five percent (75%) of the required current, the system proceeds to step 245 and sets a new gas gauge period and then returns in step 247. If not, the LEDs are flashed at a 2 Hz rate in step 249. If the current required by the active pocket can be sufficiently supplied by the power supply 28, the gas gauge timer is loaded in step 245 and measurements are made in steps 251 and 253 until the gas gauge timer has expired. Once the gas gauge timer expires, the priority flag is cleared in step 255. The system them checks in step 257 whether the battery voltage BATT is greater than a value LIM1, obtained from the EEPROM 32. If not, the system proceeds to step 253. If so, the system proceeds to step 259 and sets the red and yellow LEDs and again checks in step 261 whether the battery voltage BATT is greater than a second value LIM2 obtained from the EEPROM 32. If not, the system then returns to step 243, otherwise, the red LED is set.

NICK_TRICKLE_INIT STATE

Figure 10A:
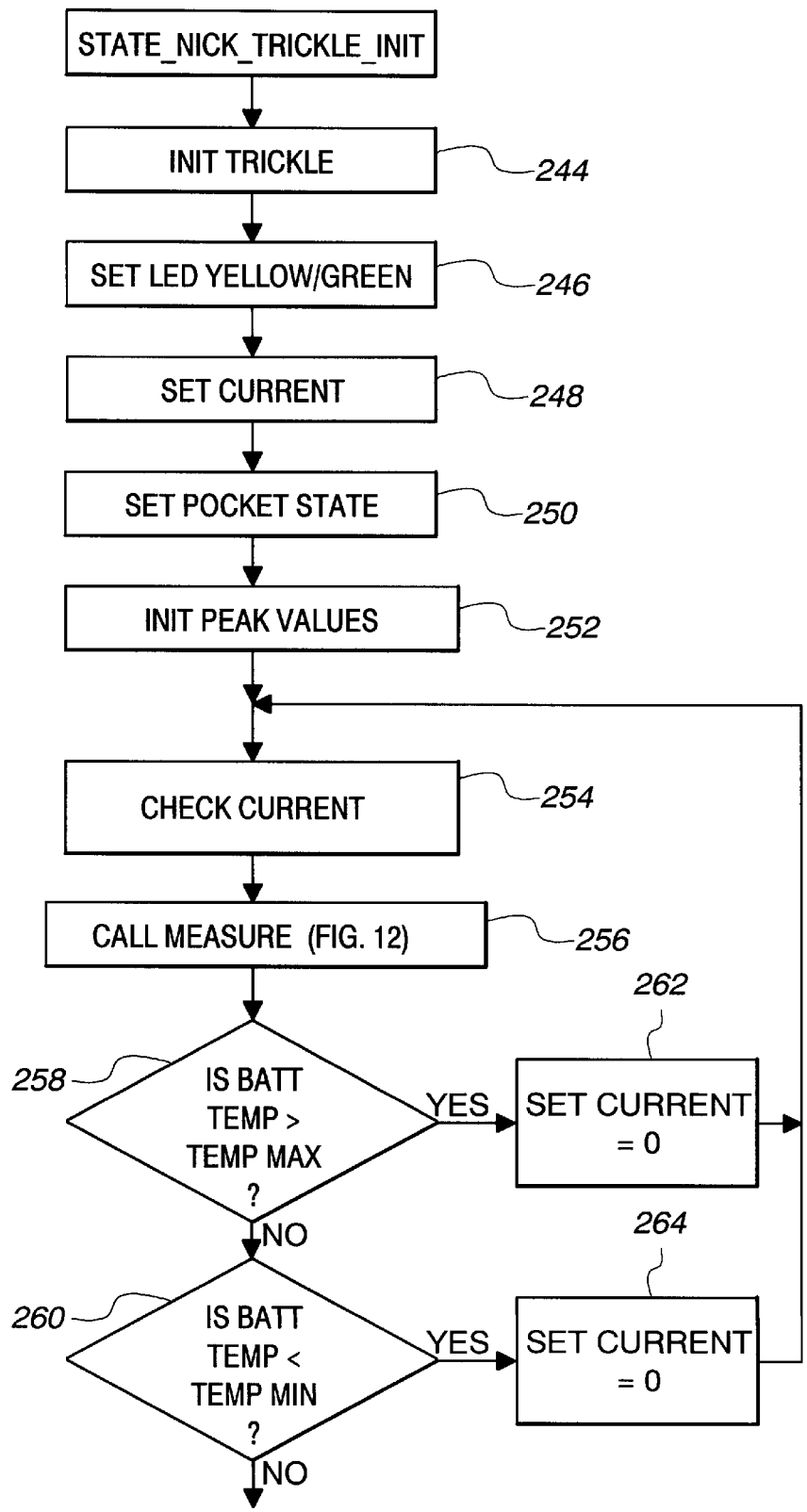
Figure 10B:
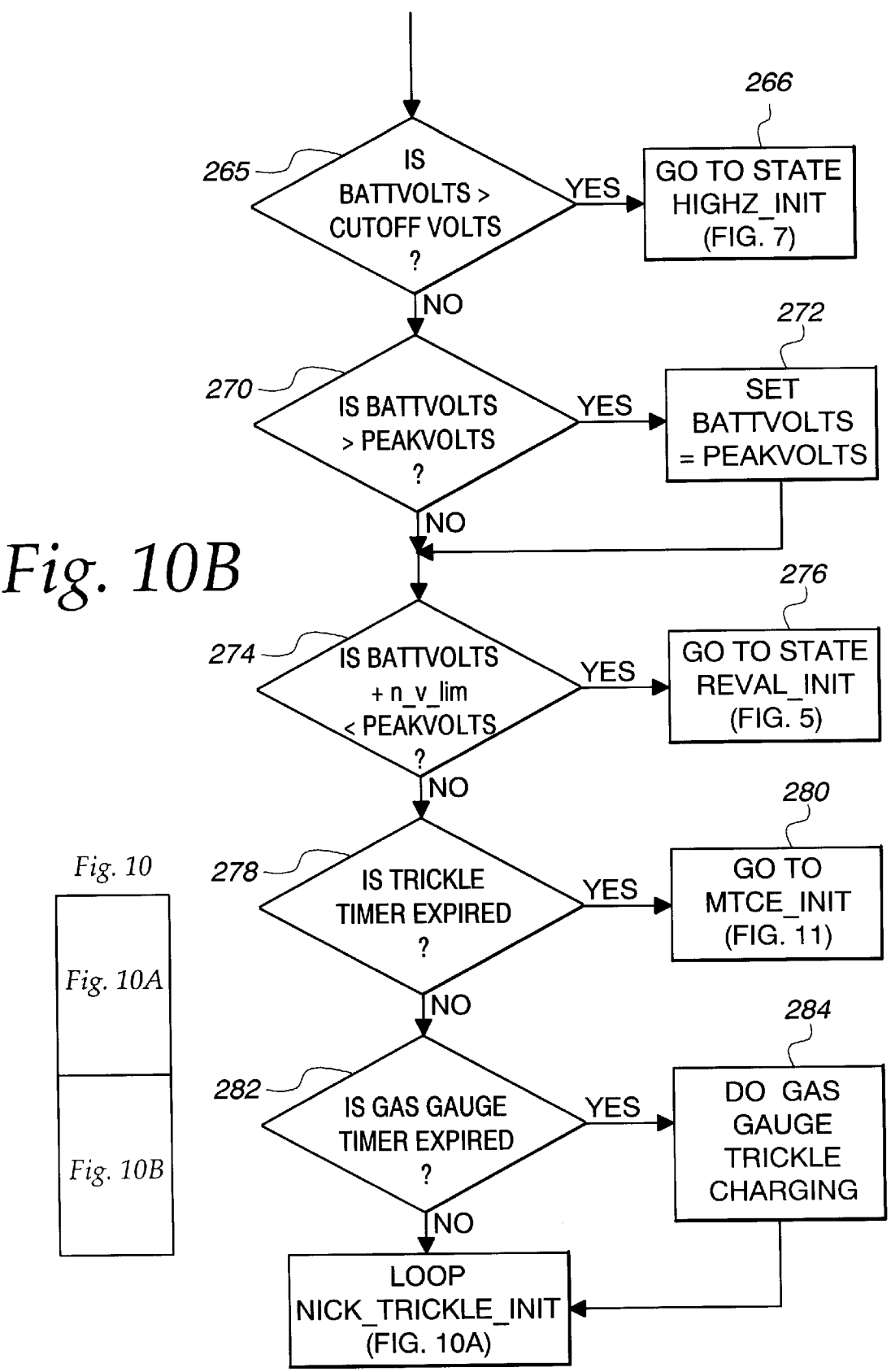

The flow chart for the NICK_TRICKLE_INIT state is illustrated in FIGS. 10A and 10B. Initially, in step 244, the trickle timer is initiated. After the trickle timer is initiated, the yellow LED2, LED5 and green LED3 and LED6 LEDs are set in step 246 to indicate trickle charge. After the LEDs are set, the current level for trickle charging of the battery is set in step 248. The current level is retrieved from a table value. In step 250, the pocket state is set to NICK_TRICKLE_INIT.

The system normally tracks the peak voltage of the battery and stores this voltage as PEAK VOLTS. In order to determine if the battery voltage is dropping, the PEAK VOLTS value is cleared in step 252. The system next enters into a trickle charge loop in which the current is checked in steps 254 and 256. In steps 258 and 260, the battery temperature BATT TEMP is checked to determine if it has gone above the maximum temperature permissible, TEMP MAX, or below the minimum temperature permissible, TEMP MIN. If the battery temperature is greater than the maximum temperature permissible, TEMP MAX, or less than the minimum temperature permissible, TEMP MIN, the battery current is turned off in steps 262 and 264, respectively, and the system loops back to step 254 and checks the current and continuously loops until the battery temperature is within range. After the battery temperature is checked in steps 250 and 260 and found to be within the minimum and maximum temperature range, the battery voltage is checked in step 266 to determine if the current battery voltage is greater than the cut-off voltage CUT-OFF VOLTS, a stored table value for the trickle charge state indicating the maximum allowable voltage. If the battery voltage is greater than the cut-off voltage CUT-OFF VOLTS, the system goes to the HIGHZ state, as indicated in step 266. If the battery voltage is not greater than the cut-off voltage CUT-OFF VOLTS, the system next checks in step 270 to determine if the battery voltage is greater than the peak voltage PEAK VOLTS. If so, the battery voltage VBATT is set to equal the peak voltage PEAK VOLTS in step 272. If not, the system checks in step 274 to determine if the battery voltage VBATT is less than the peak voltage PEAK VOLTS. If so, the system goes to the REVAL_INIT state in step 276. If not, the system proceeds to step 278 to determine if the trickle timer has expired. If so, the system goes to a maintenance charge state MTCE_INIT in step 280. If not, the system checks to see if the gas gauge timer expired in step 282. If so, the system does a gas gauge as discussed above and continues trickle charging in step 284.

MTCE_INIT STATE

Figure 11A:
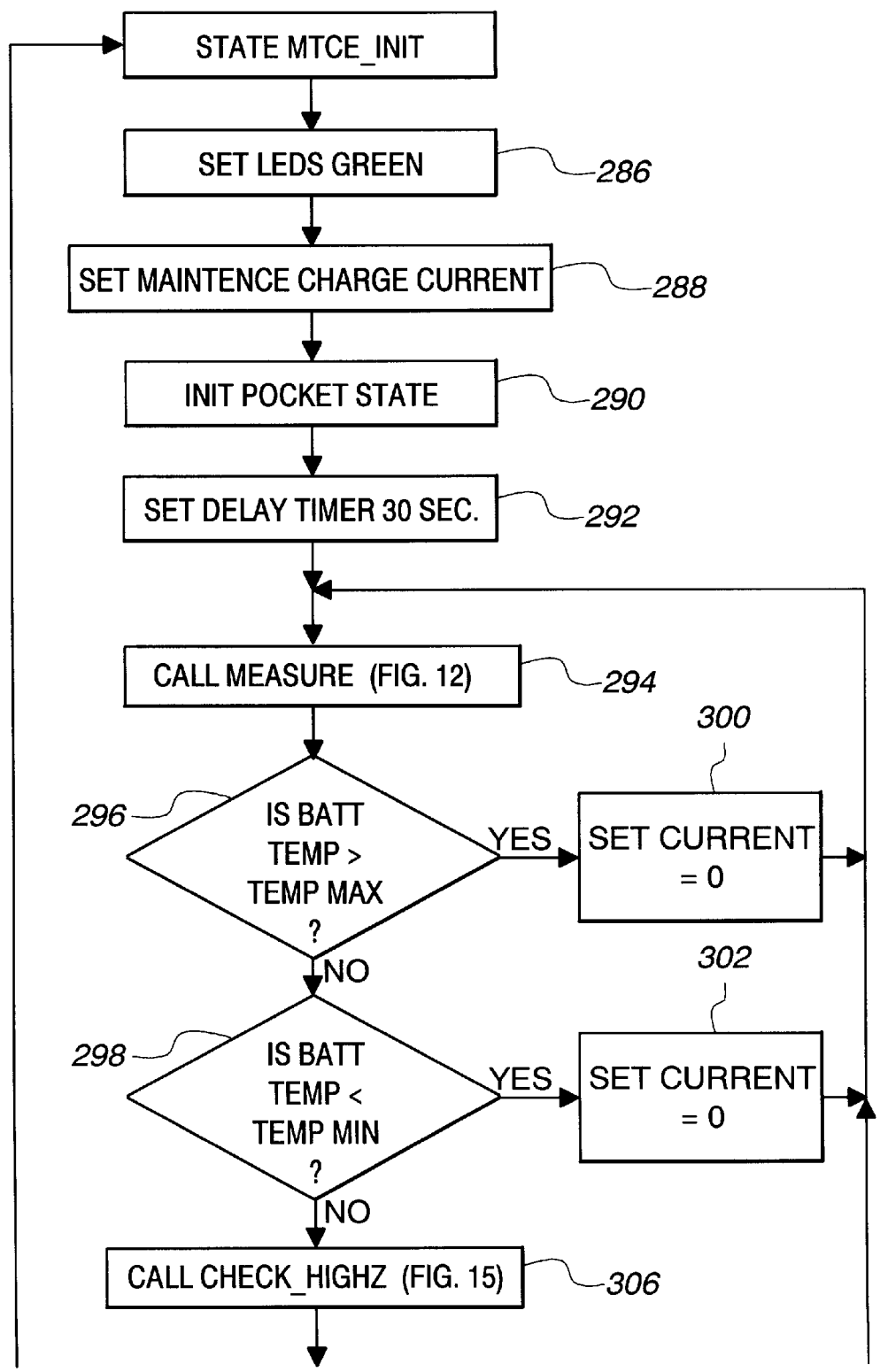

The flow chart for the maintenance charge state MTCE_INIT of the battery is illustrated in FIGS. 11A and 11B. Initially, in this state, the green LEDs, LED3 and LED6, are set in step 286 to indicate that the charger is in a maintenance charge mode. After the green LEDs are set, the maintenance current level is set in step 288 and the pocket state is initiated for maintenance state in step 290. After the pocket state is set in step 290, a maintenance timer is initiated for 30 seconds, for example, in step 292. The battery temperature in the front and rear pockets 24, 26 is measured in step 294 by way of the F-THERM and R-THERM signals, applied to the A–D input ports on the microcontroller 30 in step 294. The measured values of the battery temperature BATT TEMP are then compared with the minimum and maximum values from the table in steps 296 and 298. Should the battery temperature BATT TEMP either exceed the maximum temperature, TEMP MAX or be less than the minimum temperature TEMP MIN, the current is immediately set to zero in steps 300 and 302, respectively, and the system loops back to step 294 until the temperature returns to the recommended range between the maximum TEMP MAX and minimum TEMP MIN temperature values. Once the battery temperature is within the recommended temperature range, the system proceeds to step 306 and checks if the battery is in a HIGHZ condition in which the current is turned off and the thermistors are checked to determine if they are applicable (see FIG. 15). After the thermistors are checked, the system then checks in step 308 to determine if the 30-second maintenance timer delay has expired. If not, the system loops back to step 294 and continues checking the temperature. Once the maintenance timer has expired, the system initializes the peak voltage value in step 310 and sets a peak voltage flag in step 312. A After the peak voltage value is initialized, the system checks in step 314 to determine if the battery voltage is less than the peak voltage minus a value from the battery or default tables. If so, the battery voltage is assumed to drop to a level requiring trickle charging and the system proceeds to the nickel charge mode NICK_TRICKLE_INIT in step 316. If not, the system proceeds to step 318 and determines if the gas gauge timer is expired. If not, the system loops back to step 294 and continues a maintenance charge on the battery while checking the temperature level. If so, charging is discontinued in step 320.

MEASURE

Figure 12A:
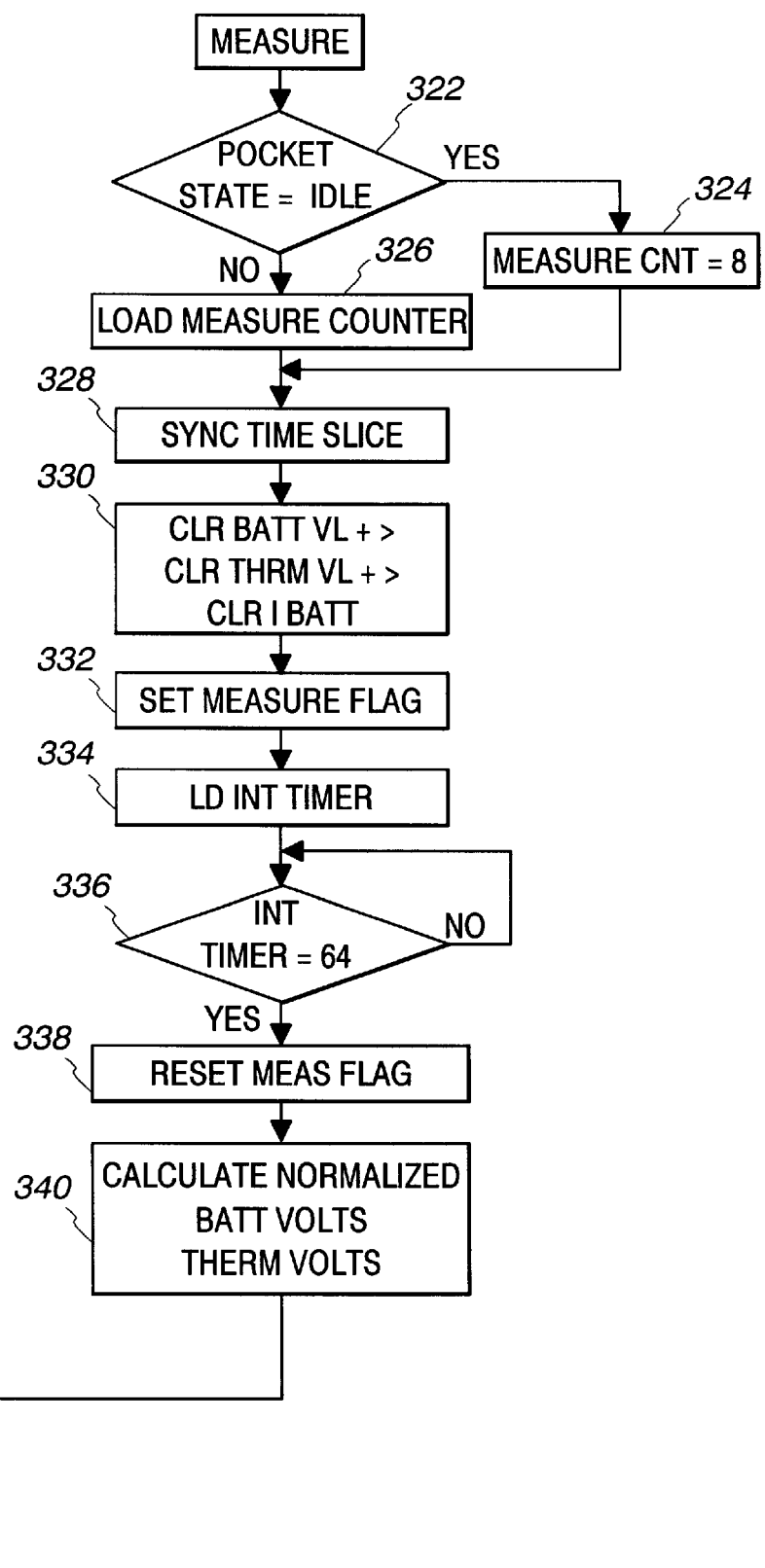
Figure 12B:
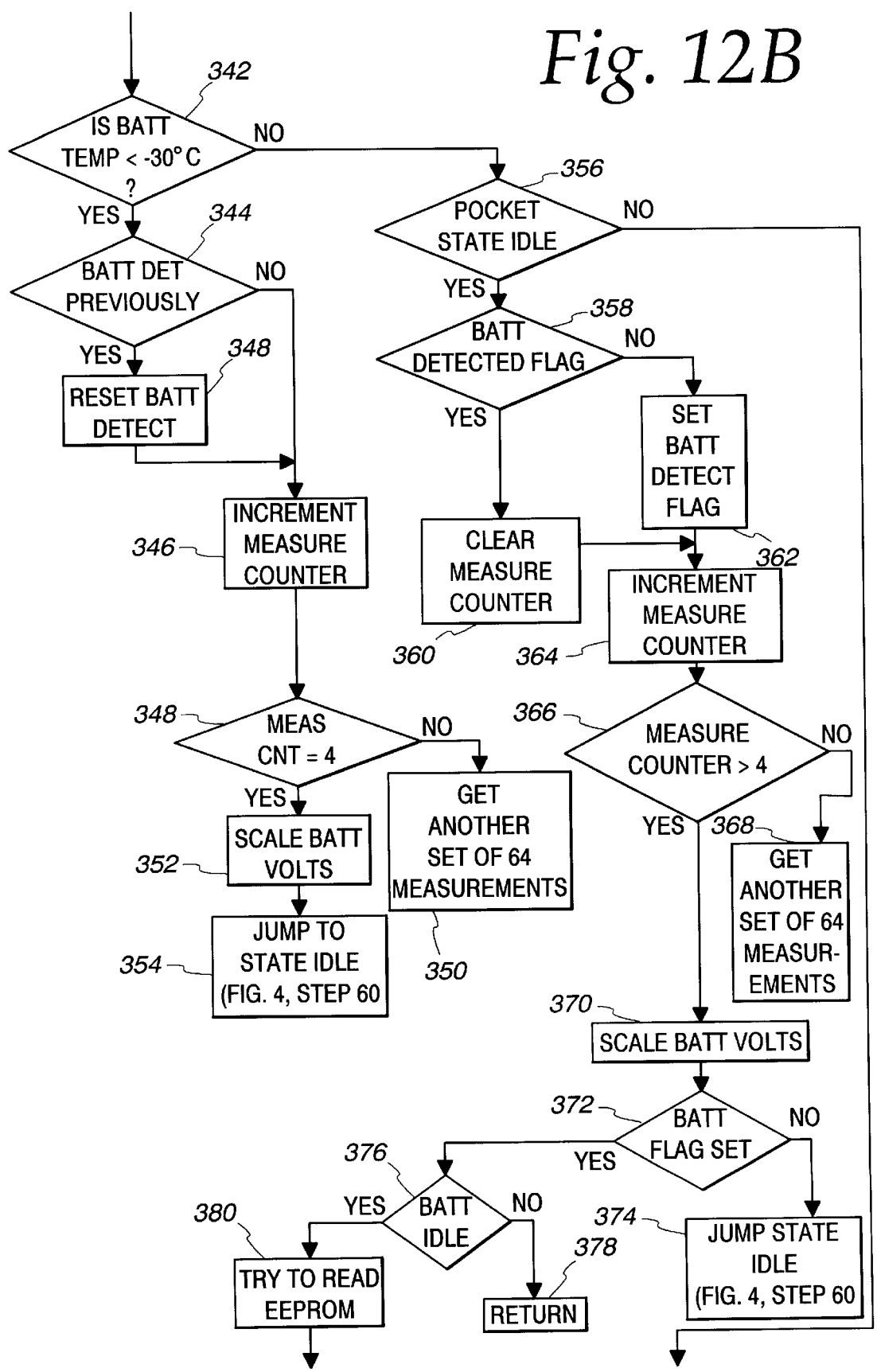

The flow chart for the subroutine MEASURE is illustrated in FIGS. 12A–12C. As mentioned above, the system is interrupt-driven by way of an internal hardware counter on board the microcontroller 30. The interrupt counter is used to interrupt the microcontroller 30 and read the battery parameter values for the front and rear pockets 24, 26, respectively. In particular, the battery voltage VBATT, current IBATT, and temperature level BATT TEMP for each of the pockets 24, 26 is continuously and alternatively read by the system on an interrupt level. In addition to requesting the various battery values, thermistor and currents to be read, the MEASURE subroutine also swaps contexts (alternates between pockets on a time division multiplex basis) at predetermined time slices, for example, every 62.5 milliseconds.

Referring to FIG. 12, the MEASURE subroutine first checks the pocket state to determine whether it is in an idle state in step 322. If the system is in an idle state, the measure counter is set to 8 in step 324 to enable four measurements to be made for each of the front and rear pockets 24, 26 to be made in a row in order to determine whether there are batteries in these pockets. If the system is not in an idle state, the measure counter is set to zero in step 326. As mentioned above in connection with the idle state, the system ascertains whether a battery is present in each of the front and rear pockets 24, 26.

Measurements are made on an interrupt basis. An interrupt is generated at every predetermined interrupt period, for example, 244 μsec. As will be discussed in more detail below, the MEASURE subroutine initiates battery parameter measures at every interrupt for a predetermined number of interrupts; for example, 64 sets of measurements are taken to provide an average value. Each time a set of 64 measurements is made, a measure counter is incremented. Measurements are made for a predetermined number of counts on the measure counter, for example, 4. Thus, with the exemplary parameters discussed above, a time slice is defined as 64 measurements×4 loops×0.244 μsec., or about 62.5 milliseconds; the amount of time allotted to each pocket 24, 26. Since base level measurements will be alternatively made in both the front and rear pockets 24, 26, the time slices for the particular pockets are synchronized in step 328. In other words, the interrupt counter for the active pocket is set to zero and the contexts (i.e. pockets) are swapped. After the time slice is initialized in step 328, previously read battery values, such as the voltage, thermistor and current values, are cleared from the system RAM in step 330. Once the previously read values are cleared, a measure flag is set in step 332 to indicate that the thermistor measurements for that context or pocket are to be taken. Once the measure flag is set, the interrupt counter is loaded in step 334. The interrupt counter is used for the A–D conversions. In particular, the interrupt timer allows 64 sets of A–D conversions to be made in step 336. The system continues looping until all 64 A–D conversion measurements have been made. Subsequently, in step 338, the measure flag is reset and the normalized values for the measured battery voltage and temperature are calculated in step 340. The constants from the EEPROM 32 (i.e., slope and offset values) (32) are factored into the measurements of the battery voltage VBATT and temperature measurements. Subsequently, in step 342, the system determines whether the battery temperature is less than −30° C. If so, the system determines in step 344 whether a battery was detected previously for the active pocket, by checking the battery detection flag indicating a battery present for that pocket. If no batteries have previously been detected, the system proceeds to step 346. If a battery was previously detected, the system resets the battery detection flag in step 348 before proceeding to step 346. As mentioned above, the system normally makes four loops to detect if a battery is present. Thus, once a battery is detected, the battery detection loops are reset. As mentioned above, the system makes loops for about four measurements. Thus, in step 346, the measure counter is incremented. In step 348, the system determine whether four sets of measurements have been taken. If not, an additional 64 A–D conversions are made in step 350. If all the measurements have been made, the battery voltage measurements are scaled in step 352 and the system goes to the idle state in step 354.

Figure 13A:
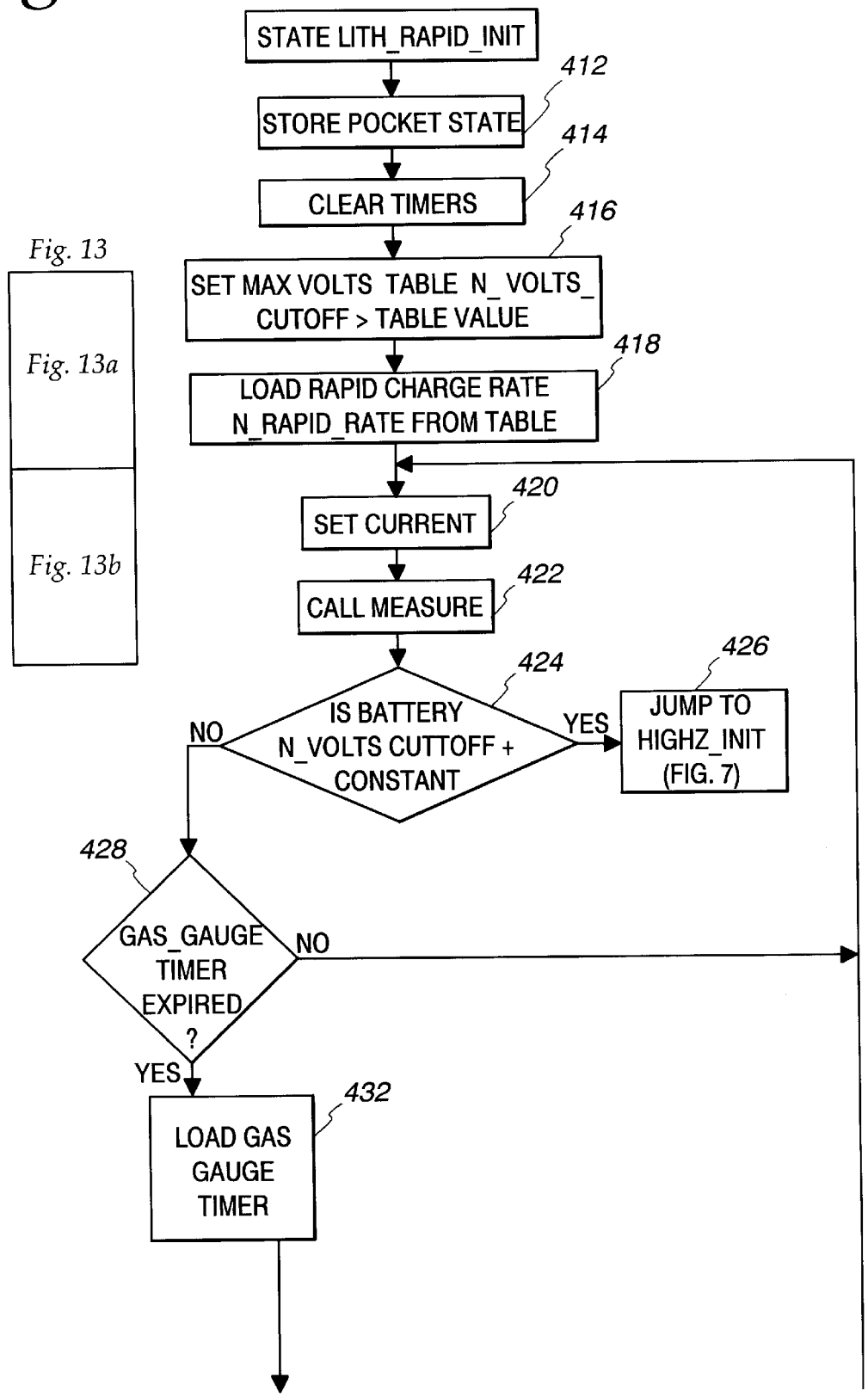

If the system determine in step 342 that the battery temperature is ≧−30° C., the system checks the pocket state in step 356 to determine if the system is in an idle state. If the system is in an idle state, the system checks in step 358 whether the battery detection flag has been set. If the battery detection flag has been set, the measure counter is cleared in step 360. If the battery detection flag has not been set, it is set in step 362 and the measure counter is incremented in step 364 to enable additional sets of 64 A–D measurements to be taken, until four sets of measurements have been taken, as indicated in steps 366 and 368, as discussed above. Once all the measurements are taken, the battery voltage is scaled in step 370. After the battery voltage measurements are scaled, the system checks in step 372 to determine whether the battery flag has been set. If not, the system goes to the idle state in step 374. If so, the system checks in step 376 whether the system is in the idle state. If not, the system returns in step 378. If the battery is in the idle state, a reading of the EEPROM in the battery pack is attempted in step 380. As indicated above, the battery pack EEPROM contains various information regarding the battery type and size available to the system over the -COMM and -SIZE terminals. Thus, in step 382, the system checks whether the battery pack EEPROM is present. If the battery pack EEPROM is present, the system checks whether the battery is a lithium type battery in step 384. If so, a bit is set in step 386 to indicate that the battery is a lithium type and the system goes to the LITH_RAPID_INIT state (FIG. 13A). If it is ascertained from the data read from the battery packEEPROM that the battery is not a lithium type, the system assumes that the battery is a nickel cadmium (NiCd) nickel metal hydride (NiMH) type battery and then attempts to read the size of the battery in step 388. As mentioned above, for smart battery packs, the battery charger 22 communicates with the battery pack by way of the -SIZE and -COMM terminals. Thus, once it is determined in step 388 that the battery is a nickel type battery, the system determines in step 390 whether the nickel battery is a large battery i.e., a battery where the -SIZE pin is shorted to the -BAT-+ line. If it is determined that the battery is not a large battery, a slim battery is assumed, and the system returns in step 392. If the battery is a large battery, a bit indicating a large battery is set in step 394, after which the program returns in step 396.

As mentioned above, the system determines the pocket state of the charger in step 356. If the pocket state is determined to not be in an idle state in step 356, the system checks in step 398 whether the other battery pocket or context has priority. If so, the system jumps back to the beginning of the measure subroutine in step 400, i.e., will not return from measure if the other pocket has priority. If the current pocket has priority, the measure counter is incremented in step 402. As mentioned above, four sets of measurements are made for the active pocket. Thus, in step 404, the system determines whether or not all four sets of measurements have been made. If not, the system gets additional measurements in step 406. If all of the measurements have been made, they are scaled in step 408, and the values are returned in step 410. The process is then repeated for the other pocket.

LITH_RAPID_INIT STATE

Figure 13B:
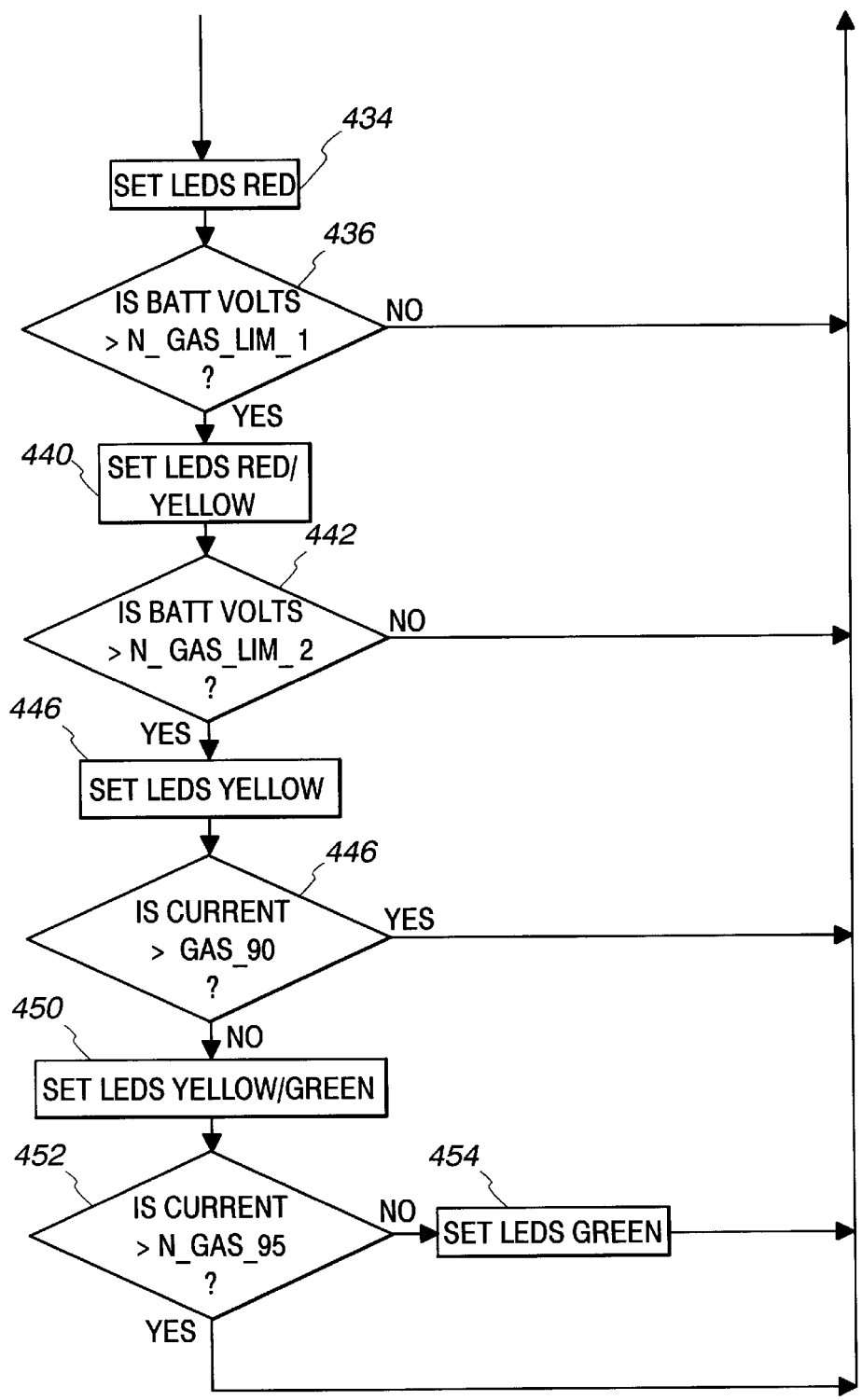
Figure 14:
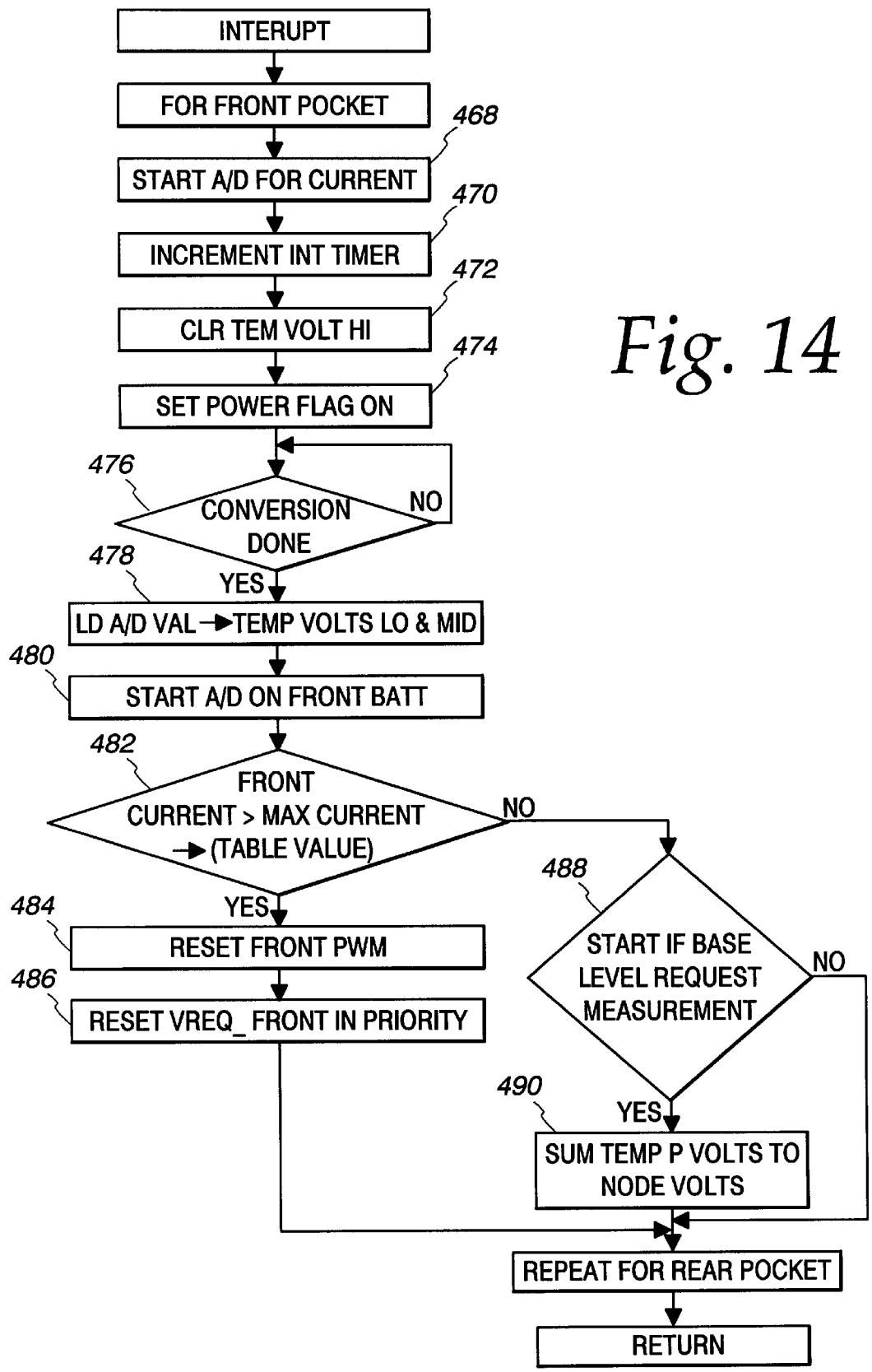

The flow charts for the LITH_RAPID_INIT STATE are illustrated in FIGS. 13A–13B. Referring first to FIG. 13A, the pocket state for the LITH_RAPID_INIT STATE is loaded initially in step 412. After the pocket state is loaded in step 412, all timers are cleared in step 414, and the maximum voltage for the lithium battery is selected from the tables stored in the battery EEPROM 32 in step 416. The charge rate N_RAPID_RATE obtained from the table in the EEPROM 32 is also read from the table in step 418. After the voltage and the charge rate have been selected, the current is set in step 420. Once the charging rate is set, the system calls the MEASURE subroutine in step 420 to make measurements, as discussed above, in order to enable the system to check whether the battery voltage VBATT is greater than the cut-off volts plus a constant in step 424. If the battery voltage is greater than the cut-off volts plus a constant, the system goes to the HIGHZ state in step 426. Otherwise, the system checks the gas gauge timer to determine whether it has expired in step 428. If the gas gauge timer has not expired, the system loops back to step 412. Otherwise, the timer value from the table for the gas gauge timer is loaded in step 432. Once the gas gauge timer is loaded, the red LED is turned on in step 434. The system then checks whether the battery voltage is greater than a constant N_GAS_LIM1. If not, the system loops back in step 436. If the battery voltage is not greater than the constant N_GAS_LIM1, the system loops back to step 412. Otherwise, the red and yellow LEDs are set in step 440, after which the system checks in step 442 whether the battery voltage is greater than a second constant N_GAS_LIM2. If the battery voltage is less than the second voltage limit N_GAS_LIM2, the system loops back to step 412. Otherwise, the yellow LEDs are set in step 446, after which the system checks the current. More particularly, in step 446, the system checks whether the current is greater than a predetermined value. If so, the system loops back to step 412. Otherwise, the yellow and green LEDs are set in step 450. Once the yellow and green LEDs are set, the system checks in step 452 whether the current is greater than a second constant N_GAS_95. If not, the green LEDs are set in step 454, and the system loops back to step 412. If the current is greater than the constant N_GAS_95, the system loops back to step 420.

INTERRUPT

The flow chart for the interrupt routine is shown in FIGS. 14A and 14B. As mentioned above, the system is interrupt driven. Referring first to FIG. 14A, the battery voltage and current inputs are connected to the A–D ports on the microcontroller 30. The interrupt routine does both current and voltage regulation for both the front and rear pockets 24, 26, respectively. The interrupt routine also causes voltage measurements for the battery, as well as thermistor and resistor node measurements to be made for each of the pockets. After the A–D process is initiated, the interrupt counter is incremented in step 470. The TEMP_VOLTS_HIGH value, which represents A–D conversion result registers is cleared in step 472 and a flag to turn on the A–D converters, as discussed above, is set in step 474. The system then continues looping in step 476 until the A–D conversion process is complete. Once the A–D process is complete, the A–D results registers values are stored as TEMP_VOLTS_LOW and TEMP_VOLTS_MID in step 478 after the conversion process for the front pocket in step 480. The system then checks in step 482 whether the current for the front pocket 24 is greater than the MAX current read from the table in the battery pack EEPROM in step 482. If so, the PWM flag is reset in step 484, thereby turning off the PWMS, which, in turn, disconnects the charging current from the battery source. Subsequently, in step 486, the front pocket priority flag is reset in step 486 to reset. If the current is greater than the maximum current from the table, any requested base level measurements are made in step 488 and summed with previous battery voltage measurements in step 490. Otherwise, the system proceeds to the rear pocket, and then the process as described above is repeated.

CHECK HIGHZ

Figure 15:
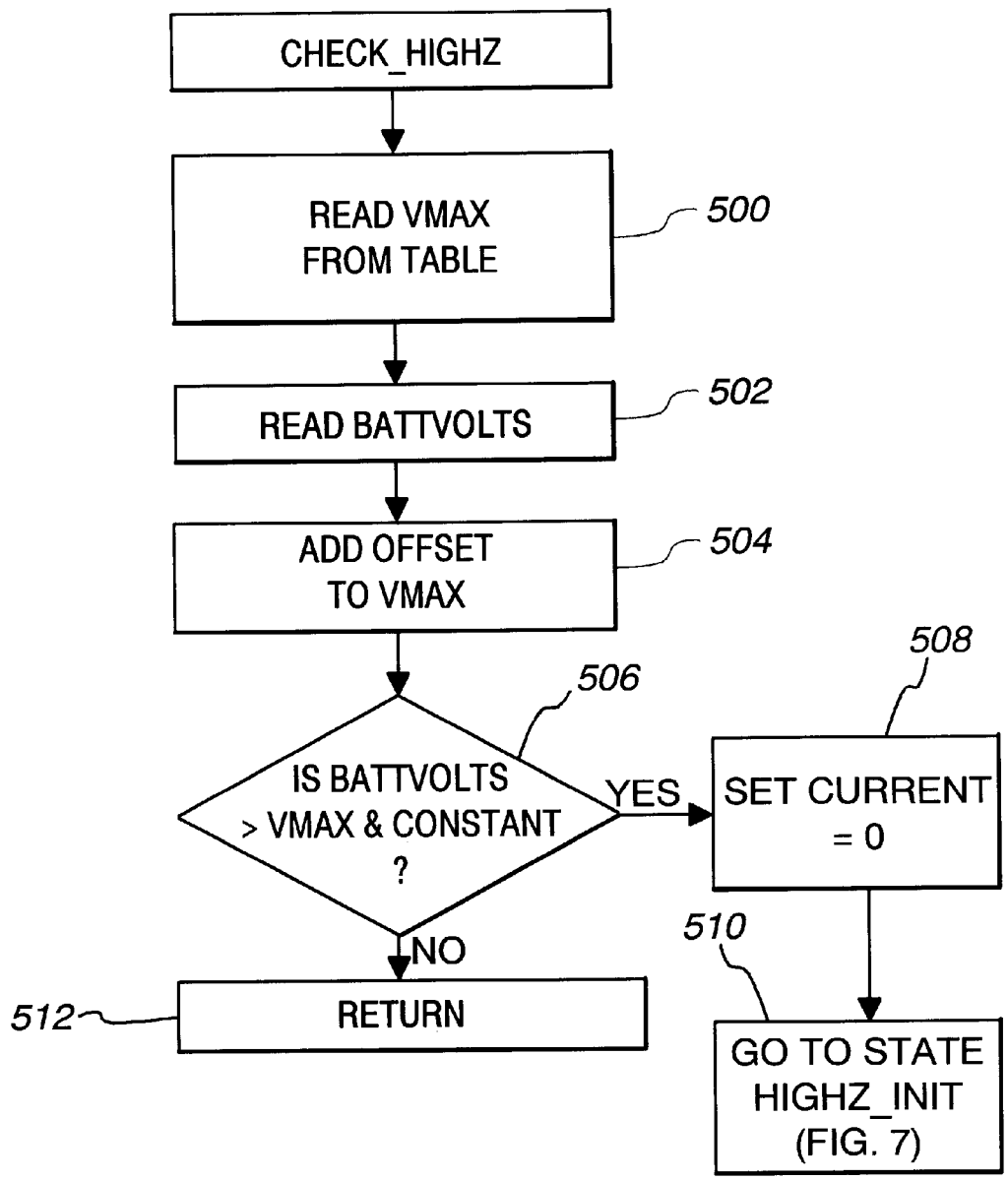

The CHECK_HIGHZ subroutine is illustrated in FIG. 15. Initially, in step 500, a value for the maximum battery voltage VMAX is read from the table in step 500. Once the value from the table for VMAX is read in step 500, the actual battery voltage is measured in step 502 in a manner as discussed above. An offset is added to VMAX in step 504, after which the battery voltage is compared with VMAX in step 506. If the battery voltage is greater than VMAX plus a constant, the system is assumed to be in a HIGHZ state. As such, the current is shut off in step 508 and the system goes to the HIGHZ_INIT state in step 510. Alternatively, the system returns in step 512.

CONSTANT VOLTAGE CHARGING

The battery charger in accordance with the present invention includes feedback to compensate for any voltage drop across the battery terminals and any protection circuitry. In particular, this constant voltage charging embodiment measures a first voltage across the battery while the battery is being charged, and a second voltage across the battery while the charging current is interrupted. The potential difference between the first voltage and the second voltage is determined to identify a voltage drop across the terminals and/or protection circuitry of the battery pack. This potential difference is used to adjust the setting of the voltage source to provide the optimum charging voltage level at the battery.

As discussed above, the PWM circuits which include the transistors Q2 and Q5 (FIG. 3A) may be used for the front and rear pockets 24 and 26, respectively to control the operating region of the power transistors Q1F and Q1R. The collector currents of the PWM transistors Q2 and Q5, under the control of respective RC circuits, control the power transistors Q1F and Q1R to provide constant current and/or constant voltage charging. More particularly, the battery voltage VBATT and charging current IBATT are read by the microcontroller 30 and used to control the PWMs by way of the I/O ports $X_0$ and $X_1$, as discussed above. Since the collector current of the transistors Q2 and Q5 are used to control the operating level of the power transistors, Q1F and Q1R, respectively, and the PWMs are controlled by the microcontroller 30, the PWMs in combination with the power transistors Q1F and Q1R function as a digital to analog converter (DAC) under the control of the microcontroller 30.

The regulated voltage source as provided by the PWM/power transistor embodiment may be adjusted by setting the ports $X_1$ and $X_0$ for the front and rear pockets high or low and measuring the battery current by way of the resistor R24 and measuring the battery voltage at the A/D ports AD3 and AD4 and adjusting the output of the ports $X_1$ and $X_0$ for the front and rear pockets so that the battery current and battery voltage does not exceed the battery current threshold N_RAPID_RATE or battery voltage threshold N_VMAX. As discussed further below, DACs may be provided to replace the PWM/power transistor combination for controlling the current supplied from the current source. The microcontroller 30 in such an embodiment is coupled to a current source via the DACs to control the charging current. The microcontroller 30 in such an embodiment measures a first voltage across the battery pack while the battery pack is being charged and a second voltage across the battery pack while the charging current is interrupted, microcontroller 30 thereby determining the potential difference between the first and second voltages to determine the voltage drop across the terminals of the battery pack and charging system. Thus, a digital interface from the microcontroller 30 to the DACs may then be used to adjust the settings of the DAC to provide the optimum voltage level. These DACs may be configured to control separate front and rear current regulators which provide two independent current regulators for driving the base of power transistors Q1F and Q1R which are increased or decreased to match the voltage with the DAC output via negative feedback, which allows the current regulation to be provided via the register setting of the DAC.

The described battery charger system provides for the identifying of an optimum voltage level for charging a rechargeable battery, and particularly identifying the appropriate voltage level corresponding to the charging characteristics of lithium ion battery cells. To this end, an alternate lithium rapid initialization state routine provides a method of charging a battery pack having at least one rechargeable lithium ion cell connected to battery terminals. As discussed further below, the method provides a regulated voltage source across the battery terminals of the battery pack.

A charging current is supplied to the rechargeable cell from the regulated voltage source, and the voltage across the battery terminals of the battery pack is measured while the charging current is being supplied. The charging current is then interrupted from time to time for the measurement of an open circuit voltage across the rechargeable cell. The system provides for subtracting the open circuit rechargeable cell voltage from the voltage measured across the battery terminals of the battery pack while the charging current is being supplied, the potential difference representing a voltage drop across the terminals of the battery. By identifying the voltage drop across the terminals, the battery charger of the alternate embodiment adjusts the voltage provided to the battery to compensate for the voltage across the terminals of the battery by increasing the voltage level of the regulated voltage by the voltage drop to provide the optimum voltage level at the rechargeable lithium ion cell.

Figure 16A:
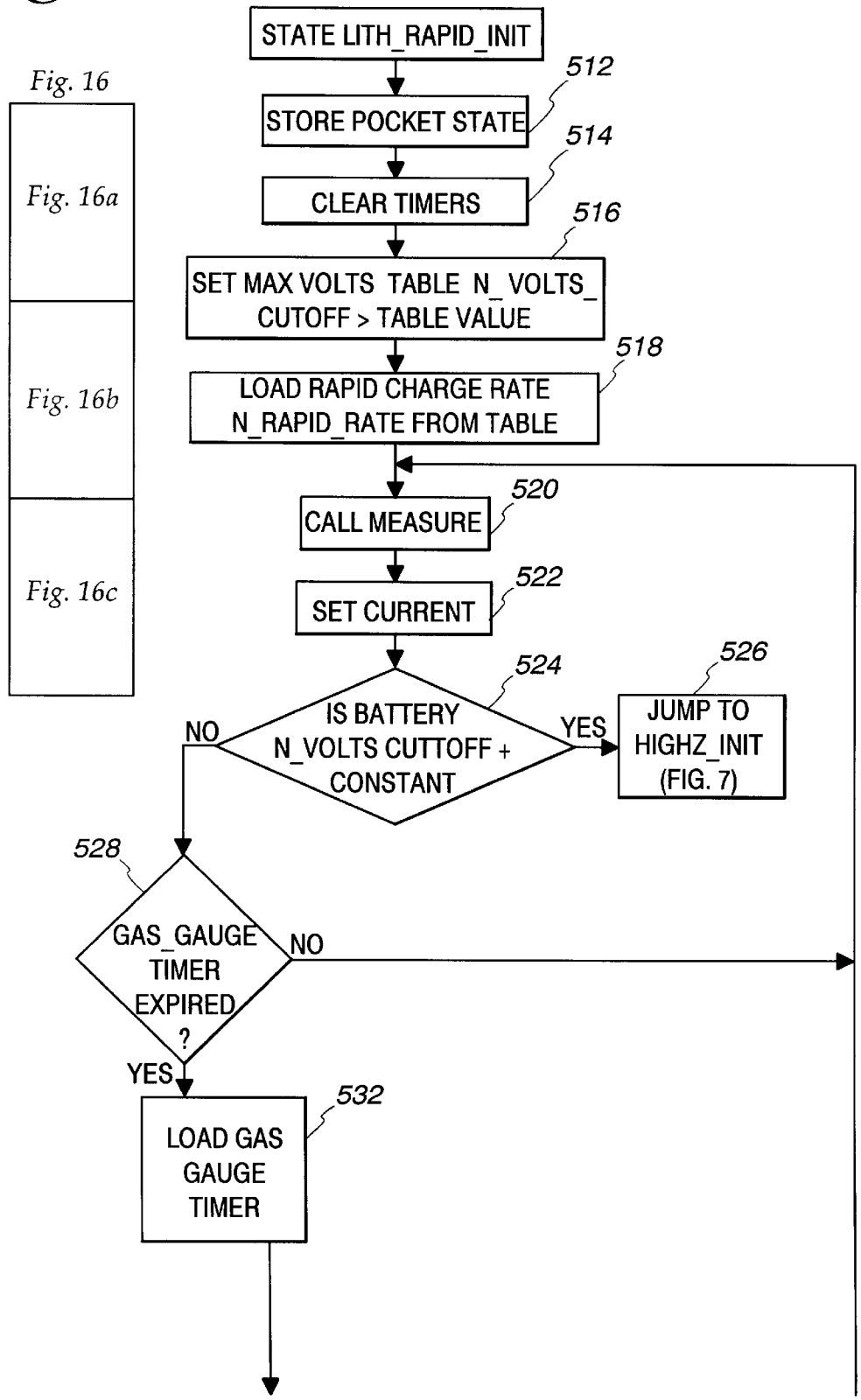
FIGS. 16A, 16B, 16C and 17 are flow diagrams for a battery charger providing optimum voltages to rechargeable cells of the battery in accordance with the present invention.
Figure 16B:
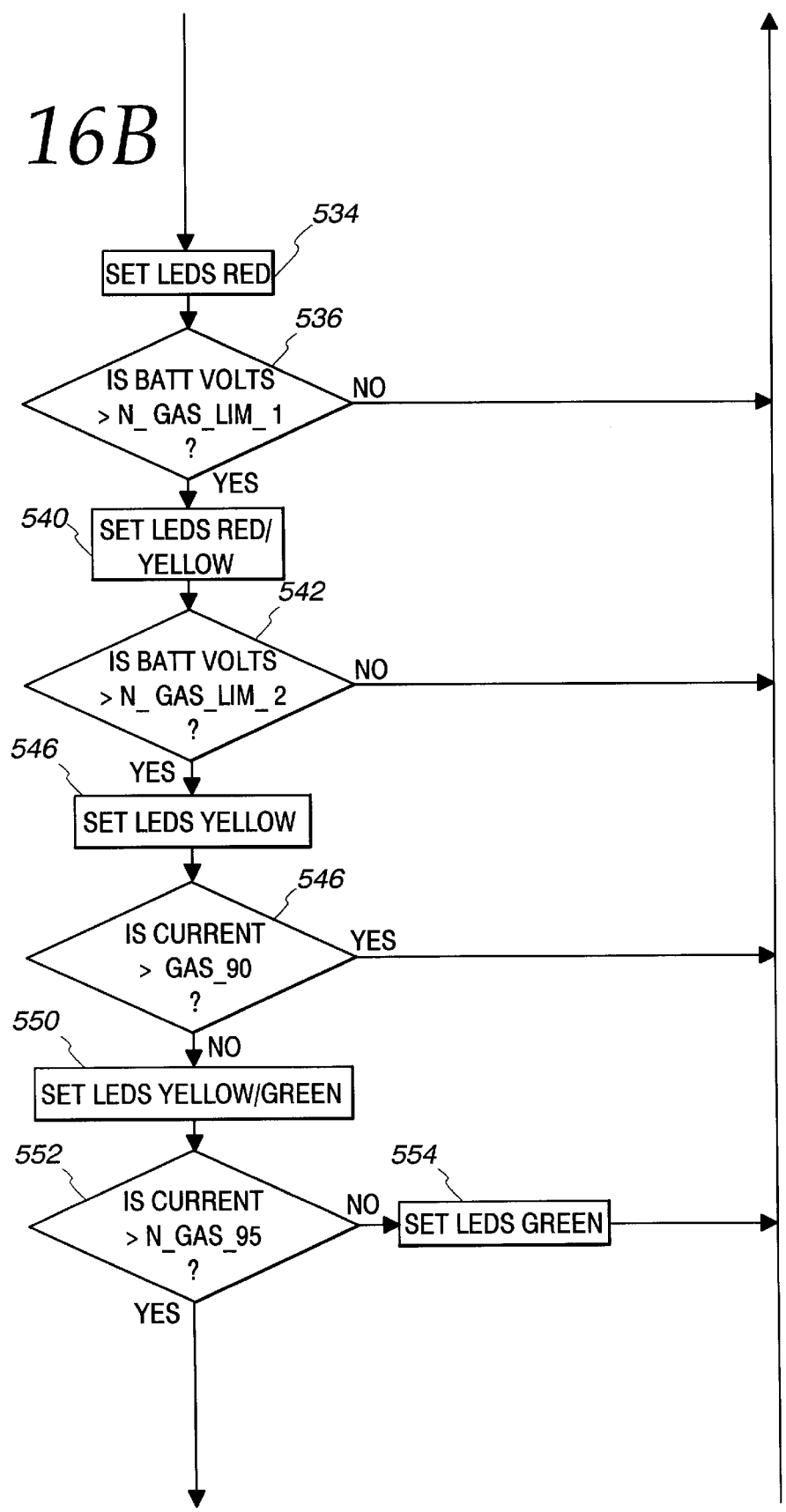

The flow charts for the alternate LITH_RAPID_INIT STATE are illustrated in FIGS. 16A, 16B, 16C and 17. Although the system is described below with respect to lithium batteries, the present invention is applicable to any battery which requires constant voltage charging. Referring first to FIG. 16A, the pocket state for the LITH_RAPID_INIT STATE is loaded initially in step 512. As was described previously, after the pocket state is loaded in step 512, all timers are cleared in step 514, and the maximum voltage for the lithium battery may be selected from charging parameter tables loaded in the battery memory in step 516. The charging characteristics may be stored in ROM, or obtained from the battery pack. The charge rate N RAPID_RATE obtained from the charging parameter table is also read from the table in step 518. After the voltage and the charge rate have been selected, the current is set in step 522, as discussed in the routine of FIG. 17. Once the charging rate is set, the system calls the MEASURE subroutine in step 520 to make measurements, as discussed above, in order to enable the system to check whether the battery voltage VBATT is greater than the cut-off volts plus a constant in step 524. If the battery voltage is greater than the cut-off volts plus a constant, the system goes to the HIGHZ state in step 526. Otherwise, the system checks the gas gauge timer to determine whether it has expired in step 528. If the gas gauge timer has not expired, the system loops back to step 512. Otherwise, the timer value from the table for the gas gauge timer is loaded in step 532. Once the gas gauge timer is loaded, the red LED is turned on in step 534.

The system then checks whether the battery voltage is greater than a constant N_GAS_LIM1. If not, the system loops back in step 536. If the battery voltage is not greater than the constant N_GAS_LIM1, the system loops back to step 512. Otherwise, the red and yellow LEDs are set in step 540, after which the system checks in step 542 whether the battery voltage is greater than a second constant N_GAS_LIM2. If the battery voltage is less than the second voltage limit N_GAS_LIM2, the system loops back to step 512. Otherwise, the yellow LEDs are set in step 546, after which the system checks the current. In step 546, the system checks whether the current is greater than a predetermined value. If so, the system loops back to step 512. Otherwise, the yellow and green LEDs are set in step 550. Once the yellow and green LEDs are set, the system checks in step 552 whether the current is greater than a second constant N_GAS_95. If not, the green LEDs are set in step 554, and the system loops back to step 512. If the current is greater than the constant N_GAS_95, the system determines whether to update the regulated power supply voltage.

Figure 16C:
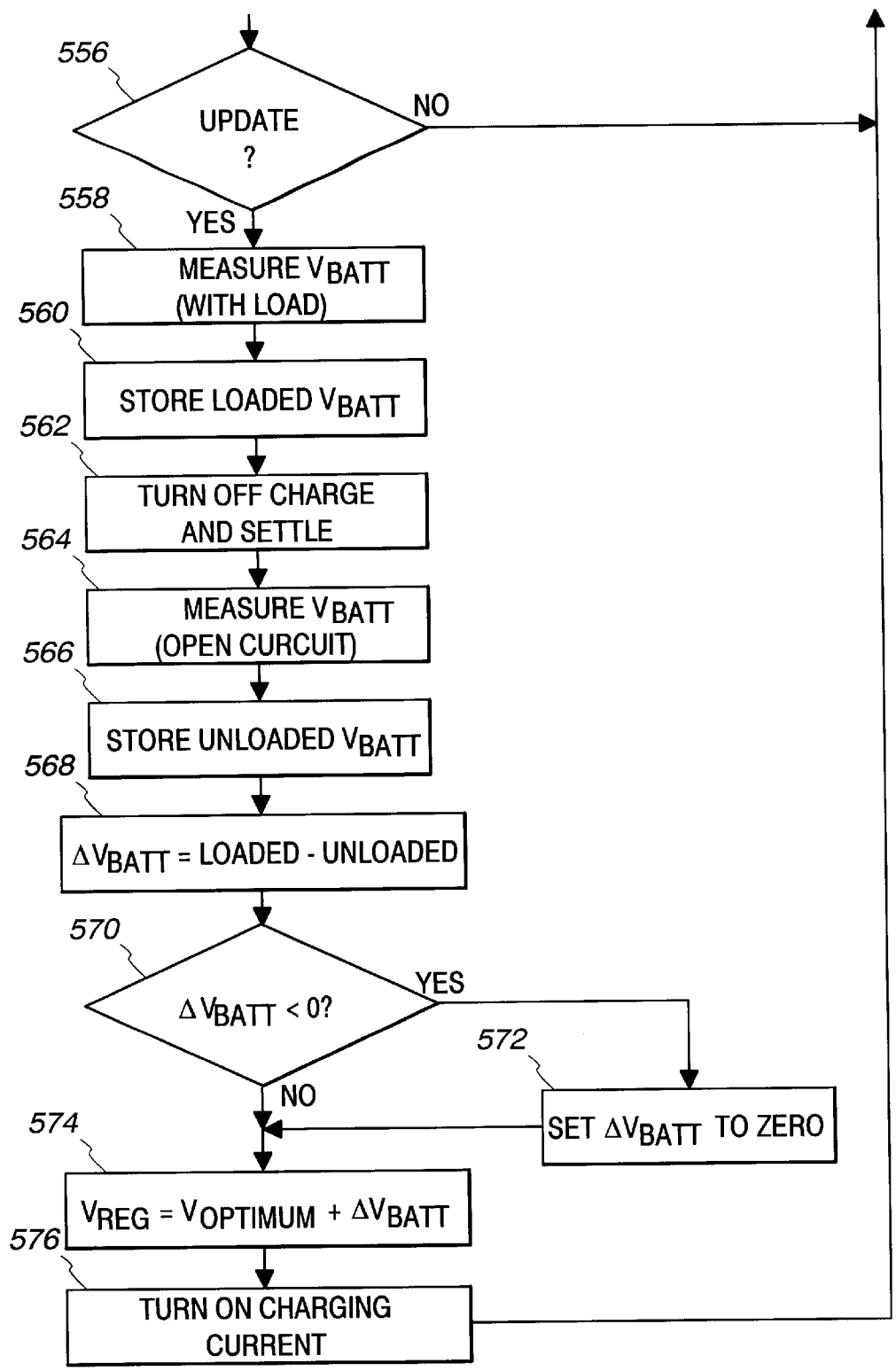

Turning now to FIG. 16C, step 556 determines whether the system should update the regulated power supply voltage used in compensating for the voltage drop across the terminals of the battery pack and charger. In this alternate preferred embodiment, a five-minute timer may be employed to periodically interrupt the charging of the battery pack for the purpose of updating the regulated power supply voltage. This interruption to the charging current may be provided either periodically or intermittently of a sufficient frequency to track any variation in the voltage drop across the battery charger terminals and the battery pack terminals in order to identify the increased voltage level of the regulated voltage output to provide the optimum voltage level at the rechargeable cell. At step 558 the system measures the battery voltage ($V_{BATT}$) with the battery charger being loaded by the rechargeable pack to provide a measurement of the battery voltage while the battery pack is being charged. At step 560 the loaded $V_{BATT}$ is stored in a microprocessor register or stack for later comparison. At step 562 the charging current is turned off and a settling time of, e.g., five seconds, is provided to allow the charging system to settle. At step 564, after the settling time of step 562, the open circuit battery voltage $V_{BATT}$ is measured by the system. At step 566, the system stores the unloaded $V_{BATT}$, i.e. the $V_{BATT}$ measured with an open circuit in the absence of a charging current.

At step 568, the voltage drop $\Delta V_{BATT}$ is determined by subtracting the unloaded $V_{BATT}$ measurement of step 566 from the loaded $V_{BATT}$ measurement of step 560 to identify the voltage drop across the terminals of the system while the battery pack was being charged. At step 570, the system determines whether the $\Delta V_{BATT}$ is less than zero. If the $\Delta V_{BATT}$ measurement corresponding to the voltage drop across the terminals is less than zero, then the $\Delta V_{BATT}$ variable of the system is set to zero at step 572. At step 574 an updated regulated voltage $V_{REG}$ is determined as $V_{OPTIMUM}$ plus $\Delta V_{BATT}$ so as to adjust the voltage level of the regulated voltage source to provide the identified optimum voltage level at the rechargeable cell. At step 576, the charging current is turned on again to allow the system to proceed with its battery charging, and prevent full return to step 520 in FIG. 16A.

Figure 17:
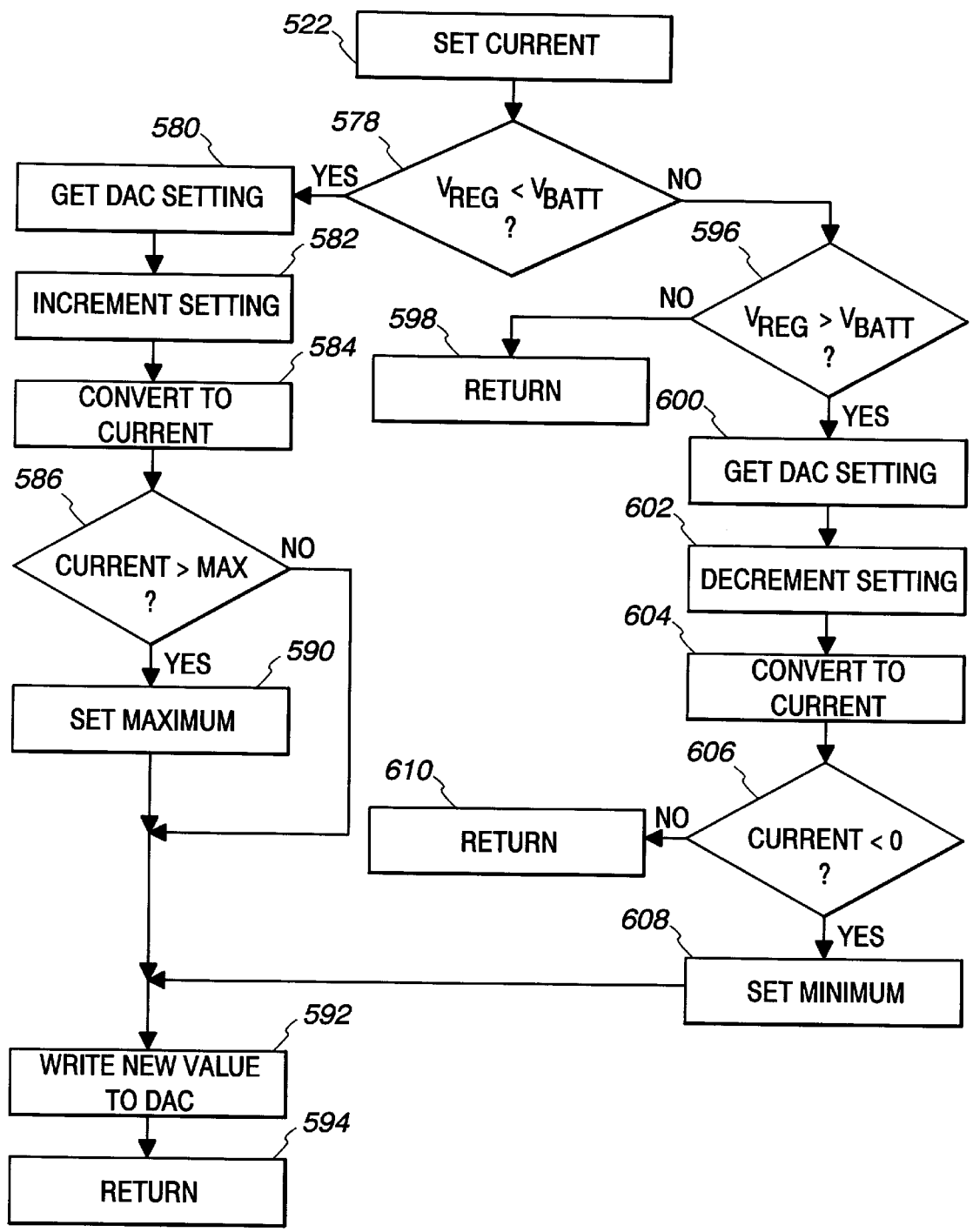

Turning now to FIG. 17, the set current subroutine 522 is used to set the DACs described below in order to provide the $V_{REG}$ charging current. At step 578 the regulated voltage is compared to the battery voltage, and if $V_{REG}$ is greater than $V_{BATT}$ then the program flow proceeds to step 580, wherein a current setting of the DACs, discussed further below, is retrieved by the system and step 582 increments the DAC setting. Step 584 uses the incremented DAC setting to determine the current provided by the current source control by the DAC. After the DAC setting is converted to a current, step 586 determines whether the resulting current is larger than the maximum allowed charging current. If the converted current of step 584 is greater than the maximum, then step 590 sets the current to the maximum allowed level, and the new value is written to the DAC at step 592. A return from the set current 522 subroutine is then executed by return step 594.

Where the regulated voltage is less than or equal to the battery voltage, step 596 determines whether the regulated voltage is smaller than the battery voltage, and if the new regulated voltage is therefore equal to the battery voltage, a return is executed at step 598. If however the regulated voltage is actually less than the battery voltage, step 600 gets the back setting and step 602 increments the DAC setting. Thereafter, step 604 converts the DAC setting to a current level for the charging of the battery pack. Step 606 determines whether the current DAC setting provides a current which is less than zero, and if so at step 608 sets the DAC to the minimum current setting, and prevents and proceeds to write the new DAC value at step 592. If on the other hand the current is not less than zero, a return is executed to step 610.

Figure 18:
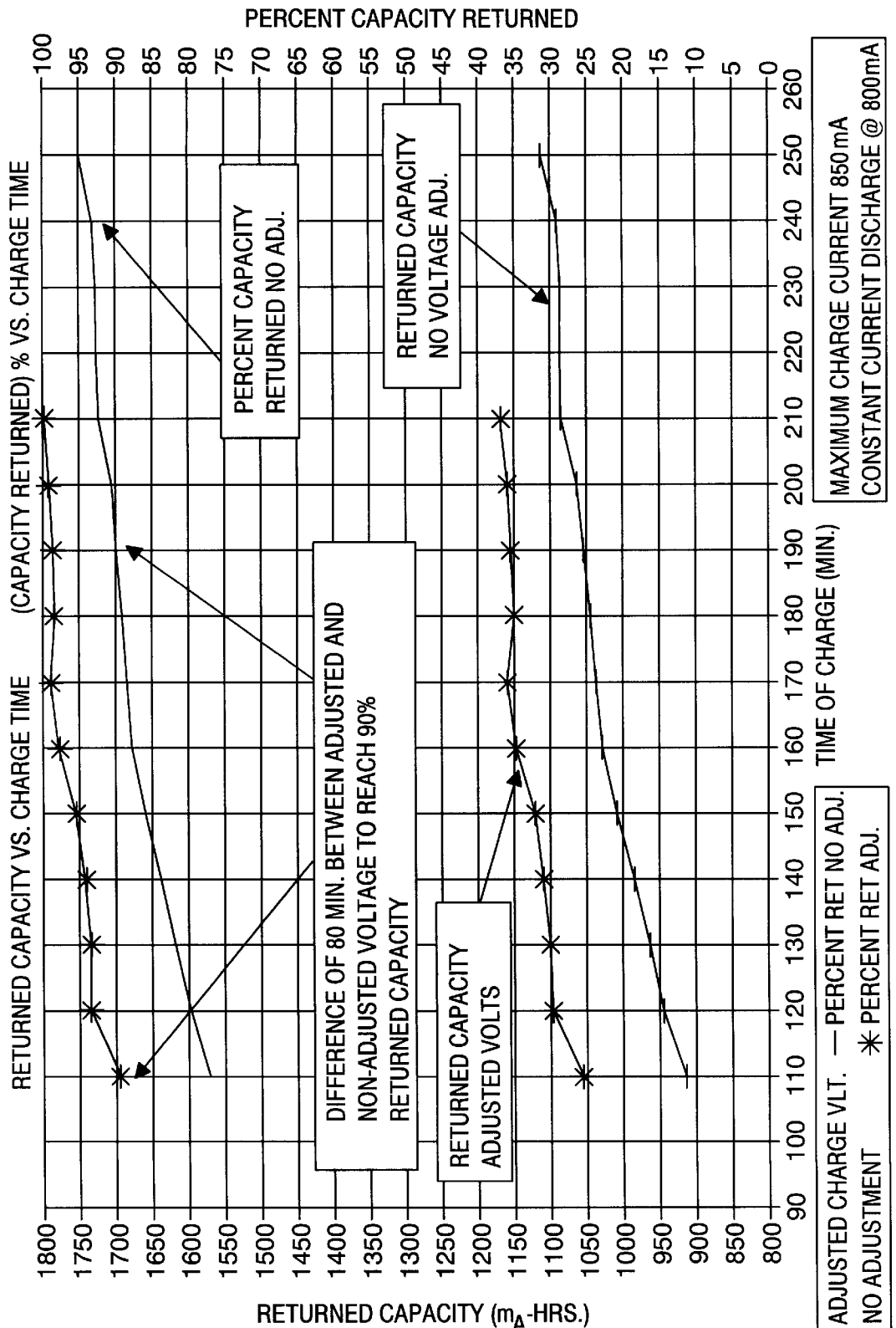
FIG. 18 shows a lithium ion battery charging capacity and charge time characteristic curve graphically illustrating the difference between the use of adjusted versus unadjusted charge voltages, as compared with a lithium ion charging system embodiment programmed according to FIGS. 16A, 16B, 16C and 17.

FIG. 18 illustrates the lithium ion battery charging capacity and charge time characteristic curve illustrating graphically the difference between the use of adjusted and unadjusted charge voltages in the lithium ion charging system discussed herein. The graphs show the charge cycle both as Returned Capacity and the percent of the Capacity Returned using both the conventional method and the corrected voltage method and apparatus described herein for widely used rechargeable lithium battery products. As can be seen from the graph, the corrected (Adjusted) charging voltage asymptotically approaches the ideal charging voltage from above while the conventional method approaches the ideal from below. In particular, it should be appreciated that Adjusted Voltage battery charging in accordance with the invention discussed above, provides 90% charge returned capacity in approximately 110 minutes. Where the Non Adjusted Voltage was employed however, a typical charge time for 90% returned capacity to the Lithium Ion battery pack was approximately 190 minutes. Accordingly, a difference of about 80 minutes in the charging times is observed as between use of Adjusted versus Non Adjusted voltages, the Adjusted Voltage providing a 90% charge in about half the time otherwise required. Thus, the graph of FIG. 18 shows a marked improvement in charge time and battery charge capacity.

APPENDIX

The source code for the system is provided in Appendix A. It should be understood that the flow charts are merely simplified representations of the source code for purposes of describing and illustrating the operation of the system. In the event of a conflict between the source code and the flow charts, the source code prevails.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A battery charger for providing a regulated voltage from a power supply for charging a battery, the battery charger comprising:
   a power transistor connected between the power supply and the battery to be charged;
   means for measuring the open circuit voltage of the battery;
   means for measuring the voltage of the battery under charge;
   means for determining the potential difference between the battery open circuit voltage and the battery voltage during charging; and
   means for controlling said power transistor responsive to said measuring means to provide a constant voltage to the battery as a function of the potential difference.

2. A battery charger as recited in claim 1, wherein said controlling means controls said power transistor to provide an optimum voltage level for recharging lithium ion (LiIon) battery cells.

3. A battery charger as recited in claim 1, wherein said controlling means controls said power transistor to provide an optimum voltage level for recharging nickel-cadmium (NiCd) battery cells.

4. A battery charger as recited in claim 1, wherein said controlling means controls said power transistor to provide an optimum voltage level for recharging nickel metal hydride (NiMH) battery cells.

5. A battery charger as recited in claim 1, wherein said controlling means controls said power transistor to provide an optimum voltage level for recharging alkaline battery cells.

6. A battery charger as recited in claim 1, wherein said measuring means comprises means for interrupting current to the battery being charged.

7. A battery charger as recited in claim 6, wherein said interrupting means periodically interrupts the current to the battery while the battery is being charged.

8. A method of charging a battery pack having at least one rechargeable cell connected to battery terminals, comprising the steps of:
   providing a regulated voltage source across the battery terminals of the battery pack;
   supplying a charging current to the rechargeable cell from the regulated voltage source;
   measuring the voltage across the battery terminals of the battery pack while the charging current is being supplied;
   interrupting the charging current and measuring the open circuit rechargeable cell voltage;
   subtracting the open circuit rechargeable cell voltage from the voltage measured across the battery terminals of the battery pack while the charging current is being supplied, the potential difference representing a voltage drop across the terminals of the battery pack;
   identifying an optimum voltage level for charging the rechargeable cell; and
   adjusting the voltage level of the regulated voltage source to provide the identified optimum voltage level at the rechargeable cell.

9. A method as recited in claim 8, wherein said identifying step comprises storing a table of voltage levels corresponding to the charging characteristics of the recharging cell.

10. A method as recited in claim 9, wherein said identifying step comprises identifying the optimum voltage levels for recharging a lithium ion battery cell.

11. A method as recited in claim 8, wherein said supplying step comprises supplying a constant charging current while the voltage level for charging the rechargeable cell is being regulated at the identified optimum level.

12. A method as recited in claim 8, wherein said interrupting step is performed repeatedly.

13. A method as recited in claim 12, wherein said interrupting step is repeated periodically after a period of several minutes.

14. A method as recited in claim 12, wherein said interrupting step is repeated approximately every five minutes.

15. A method as recited in claim 8, wherein said adjusting step compensates for the voltage drop across the terminals of the battery pack by increasing the voltage level of the regulated voltage source by said voltage drop to provide the optimum voltage level at the rechargeable cell.

16. A battery charger for providing charging voltages across a battery pack having at least one rechargeable cell connected to battery terminals, comprising:
   a current source for supplying a charging current to the battery pack;
   a digital to analog converter for controlling the current supplied from the current source;
   an analog to digital converter for measuring the voltage across the battery pack;
   a digital processor coupled to said current source and said analog to digital converter operable for controlling the charging current to measure a first voltage across the battery pack while the battery pack is being charged and a second voltage across the battery pack while the charging current is interrupted, said processor determining the potential difference between said first voltage and said second voltage to determine a voltage drop across the terminals of the battery pack;
   a memory for storing an optimum voltage level for charging the rechargeable cell; and
   a digital interface from said processor to said digital to analog converter for adjusting the setting of said digital to analog converter to provide the optimum voltage level at the rechargeable cell identified from said memory.

17. A battery charger as recited in claim 16, wherein said digital processor periodically interrupts the current to the battery while the battery is being charged.

18. A battery charger as recited in claim 16, wherein said memory coupled to said microprocessor identifies the optimum voltage levels for recharging lithium ion battery cells.

19. A battery charger as recited in claim 16, wherein said microprocessor compensates for the voltage drop across the terminals of the battery pack by increasing the voltage level of the regulated voltage source by said voltage drop to provide the optimum voltage level at the rechargeable cell.

20. A multipocket battery charger connected to a predetermined power supply, the battery charger comprising:
   a first pocket for receiving a first battery;
   a first power transistor connected between said power supply and said first pocket;
   a second pocket for receiving a second battery;
   a second power transistor connected between said power supply and said second pocket; and
   a microprocessor having a digital interface for measuring open circuit voltages and coupled to said first and said second power transistors for providing a constant voltage to the first battery and the second battery as a function of their respective open circuit battery voltages.

21. A battery charger as recited in claim 20, wherein said microprocessor periodically interrupts the current to the battery while the battery is being charged.

22. A battery charger as recited in claim 20, comprising a memory coupled to said microprocessor for identifying an optimum voltage level recharging a battery cell.

23. A battery charger as recited in claim 22, wherein said memory coupled to said microprocessor identifies the optimum voltage levels for recharging lithium ion battery cells.

24. A battery charger as recited in claim 23, wherein said first and said second power transistors supply constant charging current to said first and said second battery pockets while the voltage levels of charging the respective rechargeable cells are regulated at the identified optimum level.

25. A battery charger as recited in claim 24, wherein said microprocessor compensates for the voltage drop across the terminals of the battery pack by increasing the voltage level of the regulated voltage source by said voltage drop to provide the optimum voltage level at the rechargeable cell.

* * * * *